United States Patent
Tsukuba

(10) Patent No.: US 12,262,016 B2
(45) Date of Patent: Mar. 25, 2025

(54) IMAGE PROCESSING DEVICE, BIT STREAM GENERATION METHOD, COEFFICIENT DATA GENERATION METHOD, AND QUANTIZATION COEFFICIENT GENERATION METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 177 days.

(21) Appl. No.: 17/778,002

(22) PCT Filed: Nov. 27, 2020

(86) PCT No.: PCT/JP2020/044151
§ 371 (c)(1),
(2) Date: May 19, 2022

(87) PCT Pub. No.: WO2021/117500
PCT Pub. Date: Jun. 17, 2021

(65) Prior Publication Data
US 2023/0007265 A1  Jan. 5, 2023

(30) Foreign Application Priority Data
Dec. 11, 2019  (JP) ................. 2019-223601

(51) Int. Cl.
*H04N 19/66*  (2014.01)
*H04N 19/103*  (2014.01)
(Continued)

(52) U.S. Cl.
CPC ......... *H04N 19/132* (2014.11); *H04N 19/103* (2014.11); *H04N 19/124* (2014.11);
(Continued)

(58) Field of Classification Search
CPC .. H04N 19/132; H04N 19/103; H04N 19/124; H04N 19/176; H04N 19/18;
(Continued)

(56) References Cited

U.S. PATENT DOCUMENTS 7,200,275 B2 * 4/2007 Srinivasan ............. H04N 19/61
  375/E7.199
7,289,673 B2 * 10/2007 Lin ....................... H04N 19/196
  375/E7.199
(Continued)

FOREIGN PATENT DOCUMENTS

GB       2492333       *  6/2011

OTHER PUBLICATIONS

Bross, B.; "High Efficiency Video Coding (HEVC) Text Specification Draft 7", Apr. 27-May 7, 2012 (Year: 2012).*
(Continued)

*Primary Examiner* — Philip P. Dang
(74) *Attorney, Agent, or Firm* — XSENSUS LLP

(57) ABSTRACT

In encoding an image, a transform skip flag that is flag information indicating, for each component, whether or not to skip transform processing of transforming a residual between an image and a predicted image of the image into coefficient data is generated, the transform skip flag generated is encoded, coded data of the transform skip flag is generated, and a bit stream including the generated coded data of the transform skip flag is generated. The present encoding/decoding can be applied to, for example, an image processing device, an image encoding device, an image decoding device, a transmission device, a reception device, a transmission-reception device, an information processing device, an imaging device, a reproduction device, a bit
(Continued)

stream generation method, a coefficient data generation method, a quantization coefficient generation method, or the like.

11 Claims, 29 Drawing Sheets

(51) Int. Cl.
*H04N 19/124* (2014.01)
*H04N 19/132* (2014.01)
*H04N 19/176* (2014.01)
*H04N 19/18* (2014.01)
*H04N 19/46* (2014.01)
*H04N 19/60* (2014.01)

(52) U.S. Cl.
CPC .......... *H04N 19/176* (2014.11); *H04N 19/18* (2014.11); *H04N 19/46* (2014.11); *H04N 19/60* (2014.11)

(58) Field of Classification Search
CPC ........ H04N 19/46; H04N 19/60; H04N 19/12; H04N 19/157; H04N 19/70; H04N 19/13; H04N 19/184; H04N 19/186
See application file for complete search history.

(56) References Cited

U.S. PATENT DOCUMENTS

| | | | | |
|---|---|---|---|---|
| 10,595,046 B2* | 3/2020 | Tsukuba | ................. | H04N 19/12 |
| 10,728,552 B2* | 7/2020 | Tsukuba | ................. | H04N 19/12 |
| 11,343,538 B2* | 5/2022 | Tsukuba | .............. | H04N 19/426 |
| 2004/0234143 A1* | 11/2004 | Hagai | .................... | H04N 19/51 |
| | | | | 375/E7.257 |
| 2005/0196062 A1* | 9/2005 | Cho | ....................... | H04N 19/86 |
| | | | | 382/238 |
| 2006/0088222 A1* | 4/2006 | Han | ..................... | H04N 19/635 |
| | | | | 382/232 |
| 2010/0119169 A1* | 5/2010 | Haddad | ................. | H04N 19/61 |
| | | | | 382/250 |
| 2011/0026583 A1* | 2/2011 | Endresen | ............ | H04N 19/176 |
| | | | | 375/E7.127 |
| 2011/0103485 A1* | 5/2011 | Sato | ..................... | H04N 19/109 |
| | | | | 375/E7.123 |
| 2011/0249743 A1* | 10/2011 | Zhao | .................... | H04N 19/176 |
| | | | | 375/240.24 |
| 2012/0114039 A1* | 5/2012 | Wang | .................... | H04N 11/02 |
| | | | | 375/E7.243 |
| 2012/0127003 A1* | 5/2012 | Shibahara | ............ | H04N 19/129 |
| | | | | 341/87 |
| 2014/0056362 A1* | 2/2014 | Mrak | .................... | H04N 19/61 |
| | | | | 375/240.18 |
| 2015/0063446 A1* | 3/2015 | Sugio | .................. | H04N 19/105 |
| | | | | 375/240.03 |
| 2019/0104322 A1 | 4/2019 | Tsukuba | | |

OTHER PUBLICATIONS

Mrak, M.; "Transform Skip Mode", Jul. 14-22, 2011 (Year: 2011).*
Mrak, M.; "Results for SCC with Transform Skip Mode", Jul. 14-22, 2011 (Year: 2011).*
Gabriellini, A.; Spatial Transform Skip in the Emerging High Efficiency Video Coding Standard, ICIP 2012 (Year: 2012).*
International Search Report and Written Opinion mailed on Feb. 2, 2021, received for PCT Application PCT/JP2020/044151, Filed on Nov. 27, 2020, 9 pages including English Translation.
Bross et al., "Versatile Video Coding (Draft 5)", Joint Video Experts Team (JVET) of ITU-T SG 16 WP 3 and ISO/IEC JTC 1/SC 29/WG 11, JVET-N1001-v10, Mar. 19-27, 2019, pp. 1-394.
Tsukuba et al., "CE8: Chroma Transform Skip (CE8-3.2)", Joint Video Experts Team (JVET) of ITU-T SG 16 WP 3 and ISO/IEC JTC 1/SC 29/WG 11, JVET-O0081-v2, Jul. 3-12, 2019, pp. 1-10.
Bross et al., "Versatile Video Coding (Draft 7)", Joint Video Experts Team (JVET) of ITU-T SG 16 WP 3 and ISO/IEC JTC 1/SC 29/WG 11, JVET-P2001,-vE, Oct. 1-11, 2019, 53 pages.
Tsukuba et al., "CE8-2.1: Transform Skip for Chroma with limiting maximum number of context coded bin in TS residual coding", Joint Video Experts Team (JVET) of ITU-T SG 16 WP 3 and ISO/IEC JTC 1/SC 29/WG 11, JVET-P0058-v2, Oct. 1-11, 2019, pp. 1-10.
Nguyen et al., "Non-CE8: Minimum Allowed QP for Transform Skip Mode", Joint Video Experts Team (JVET) of ITU-T SG 16 WP 3 and ISO/IEC JTC 1/SC 29/WG 11 JVET-O0405-v1, Jul. 3-12, 2019, pp. 1-3.
Chen et al., "Algorithm description for Versatile Video Coding and Test Model 6 (VTM 6)", Joint Video Experts Team (JVET) of ITU-T SG 16 WP 3 and ISO/IEC JTC 1/SC 29/WG 11, JVET-O2002-v2, Jul. 3-12, 2019, pp. 1-87.
Clare, "CE8-4.1: BDPCM and Transform skip for Chroma", Joint Video Experts Team (JVET) of ITU-T SG 16 WP 3 and ISO/IEC JTC 1/SC 29/WG 11, JVET-P0059-v1, Oct. 1-11, 2019, pp. 1-6.
"Advanced video coding for generic audiovisual services", Series H: Audiovisual and Multimedia Systems ITU-T, Telecommunication Standardization Sector of ITU, H.264, Apr. 2017, pp. 1-787.
"High efficiency video coding", Series H: Audiovisual and Multimedia Systems, ITU-T, Telecommunication Standardization Sector of ITU, H.265, Dec. 2016, pp. 1-643.
Benjamin Bross et al., "Versatile Video Coding (Draft 7)", Joint Video Experts Team (JVET) of ITU-T SG 16 WP 3 and ISO/IEC JTC 1/SC 29/WG 11 16th Meeting: Geneva, Ch, JVET-P2001, Oct. 1-11, 2019, https://jvetexperts.org/doc_end_user/documents/16_Geneva/wg11/JVET-P2001-v14.zip.

* cited by examiner

FIG. 1

| | |
|---|---|
| 1 | SET TRANSFORM SKIP FLAG FOR EACH VALUE OF COMPONENT IDENTIFIER |
| 1-1 | FOR EACH VALUE OF COMPONENT IDENTIFIER, APPLY TS RESIDUAL ENCODING MODE IN CASE OF TRANSFORM SKIP, APPLY NON-TS RESIDUAL ENCODING MODE IN CASE OF NON-TRANSFORM SKIP |
| 1-1-1 | APPLY RESIDUAL ENCODING MODE SELECTION FLAG |
| 1-1-2 | APPLY FLAG THAT ENABLES SELECTION OF RESIDUAL ENCODING MODE IN SPECIFIC MODE |
| 1-2 | FOR EACH VALUE OF COMPONENT IDENTIFIER, CORRECT QUANTIZATION PARAMETER IN CASE OF TRANSFORM SKIP |
| 1-3 | IN CASE OF TRANSFORM SKIP, SHARE CONTEXT VARIABLE BETWEEN LUMINANCE COMPONENT AND COLOR COMPONENT CORRESPONDING TO EACH binIdx IN BIN ROW OF EACH SYNTAX |
| 1-4 | SWITCH ENCODING-DECODING METHOD OF SIGN CODE ACCORDING TO TRANSFORM SKIP FLAG CORRESPONDING TO COMPONENT IDENTIFIER |
| 1-4-1 | PERFORM BYPASS ENCODING IN CASE OF NOT TRANSFORM SKIP |
| 1-4-2 | IN CASE OF TRANSFORM SKIP, IF NUMBER OF RESIDUAL CONTEXT ENCODING BINS IS EQUAL TO OR MORE THAN THRESHOLD, CONTEXT ENCODING IS PERFORMED, AND OTHERWISE PERFORM BYPASS ENCODING |

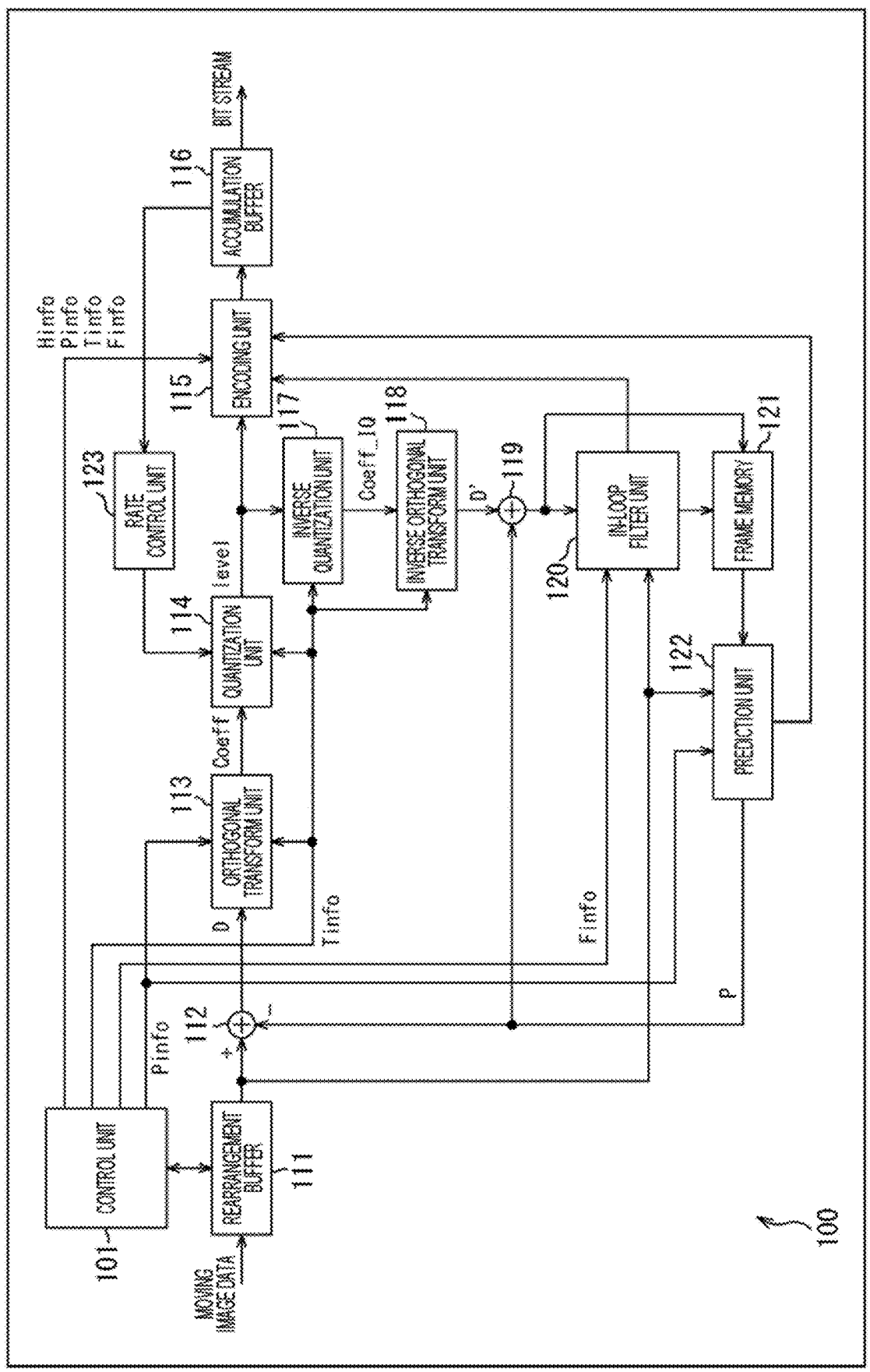

FIG. 10

| | Descriptor |
|---|---|
| transform_unit( x0, y0, tbWidth, tbHeight, treeType, subTuIndex, chType ) { | |
| ... | |
| if( tu_cbf_luma[ x0 ][ y0 ] ){ | |
| transform_mode( x0, y0, tbWidth, tbHeight, 0) | |
| if( !transform_skip_flag[ x0 ][ y0 ][ 0 ] ) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ x0 ][ y0 ] ){ | |
| transform_mode( x0, y0, wC, wH, 1) | |
| if( !transform_skip_flag[ x0 ][ y0 ][ 1 ] ) | |
| residual_coding( xC, yC, Log2( wC ), Log2( hC ), 1 ) | |
| else | |
| residual_ts_coding( xC, yC, Log2( wC ), Log2( hC ), 1 ) | |
| } | |
| if( tu_cbf_cr[ x0 ][ y0 ] && | |
| !( tu_cbf_cb[ x0 ][ y0 ] && tu_joint_cbcr_residual_flag[ x0 ][ y0 ] ) ){ | |
| transform_mode( x0, y0, wC, hC, 2) | |
| if( !transfrom_skip_flag[ x0 ][ y0 ][ 2 ] ) | |
| residual_coding( xC, yC, Log2( wC ), Log2( hC ), 2 ) | |
| else | |
| residual_ts_coding( xC, yC, Log2( wC ), Log2( hC ), 2 ) | |
| } | |
| } | |

FIG. 11

| | Descriptor |
|---|---|
| transform_mode( x0, y0, tbWidth, tbHeight, cIdx ) { | |
|   if (sps_transform_skip_enabled_flag<br>    && (tbWidth <= MaxTsSize) && (tbHeight <= MaxTsSize)<br>    && !(BdpcmFlag[ x0 ][ y0 ] && cIdx==0)<br>    && (IntraSubPartitionsSplit[ x0 ][ y0 ] == ISP_NO_SPLIT || cIdx!=0)<br>    && (!cu_sbt_flag ) ) | |
|     transform_skip_flag[ x0 ][ y0 ][ cIdx ] | ae(v) |
|   if ( ( (cIdx==0) && (tbWidth <= 32 ) && ( tbHeight <= 32 )<br>    && (IntraSubPartitionsSplit[ x0 ][ y0 ] == ISP_NO_SPLIT ) && ( !cu_sbt_flag )<br>    && ( ( CuPredMode[ chType ][ x0 ][ y0 ] == MODE_INTER &&<br>      sps_explicit_mts_inter_enabled_flag )<br>    || ( ( CuPredMode[ chType ][ x0 ][ y0 ] == MODE_INTRA &&<br>      sps_explicit_mts_intra_enabled_flag )<br>    && !trasnform_skip_flag[x0][y0][cIdx] ) ) | |
|     mts_idx [ x0 ][ y0 ][ cIdx ] | ae(v) |
| } | |

FIG. 12

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = ( ( ( 1 << log2TbWidth ) * ( 1 << log2TbHeight ) ) * 7 >> 2 | |
|   ... | |
| } | |

FIG. 13

A transform_skip_flag[ x0 ][ y0 ][ cIdx ] specifies whether a transform is applied to the transform block associated with cIdx or not. The array indices x0, y0 specify the location ( x0, y0 ) of the top-left luma sample of the considered transform block relative to the top-left luma sample of the picture. transform_skip_flag[ x0 ][ y0 ][ cIdx ] equal to 1 specifies that no transform is applied to the associated transform block. transform_skip_flag[ x0 ][ y0 ][ cIdx ] equal to 0 specifies that the decision whether transform is applied to the associated transform block or not depends on other syntax elements.
When transform_skip_flag[ x0 ][ y0 ][ cIdx ] is not present, it is inferred as follows:
 – If BdpcmFlag[ x0 ][ y0 ] is equal to 1, transform_skip_flag[ x0 ][ y0 ][ cIdx ] is inferred to be equal to 1.
 – Else if BdpcmFlag[ x0 ][ y0 ] is equal to 0 and cIdx is equal to 0, transform_skip_flag[ x0 ][ y0 ][ cIdx ] is inferred to be equal to 0.
 – Else if BdpcmChromaFlag[ x0 ][ y0 ] is equal to 1 and cIdx is not equal to 0, transform_skip_flag[ x0 ][ y0 ][ cIdx ] is inferred to be equal to 1.
 – Else if BdpcmChromaFlag[ x0 ][ y0 ] is equal to 0 and cIdx is not equal to 0, transform_skip_flag[ x0 ][ y0 ][ cIdx ] is inferred to be equal to 0.

B mts_idx[ x0 ][ y0 ][ cIdx ] specifies which transform kernels are applied to the residual samples along the horizontal and vertical direction of the associated transform block with cIdx. The array indices x0, y0 specify the location ( x0, y0 ) of the top-left luma sample of the considered transform block relative to the top-left luma sample of the picture.
When mts_idx[ x0 ][ y0 ][ cIdx ] is not present, it is inferred to be equal to 0.

FIG. 14

| | Descriptor |
|---|---|
| if( tu_cbf_luma[ x0 ][ y0 ] && treeType != DUAL_TREE_CHROMA){ | |
| if( sps_transform_skip_enabled_flag && !BdpcmFlag[ x0 ][ y0 ][ 0 ] && | |
|   tbWidth <= MaxTsSize && tbHeight <= MaxTsSize && ( | |
|   IntraSubPartitionsSplit[ x0 ][ y0 ] == ISP_NO_SPLIT ) && !cu_sbt_flag ) | |
|   transform_skip_flag[ x0 ][ y0 ][ 0 ] | ae(v) |
| if( !transform_skip_flag[ x0 ][ y0 ][ 0 ] ) | |
|   residual_coding( x0, y0, Log2( tbWidth ), Log2( tbHeight ), 0 ) | |
| else | |
|   residual_ts_coding( x0, y0, Log2( tbWidth ), Log2( tbHeight ), 0 ) | |
| } | |
| if(tu_cbf_cb[ xC ][ yC ] && treeType != DUAL_TREE_LUMA){ | |
| if( sps_transform_skip_enabled_flag && !BdpcmFlag[ x0 ][ y0 ][ 1 ] && | |
|   wC <= MaxTsSize && hC <= MaxTsSize && !cu_sbt_flag ) | |
|   transform_skip_flag[ xC ][ yC ][ 1 ] | ae(v) |
| if( !transform_skip_flag[ xC ][ yC ][ 1 ] ) | |
|   residual_coding( xC, yC, Log2( wC ), Log2( hC ), 1 ) | |
| else | |
|   residual_ts_coding( xC, yC, Log2( wC ), Log2( hC ), 1 ) | |
| if( sps_transform_skip_enabled_flag && !BdpcmFlag[ x0 ][ y0 ][ 2 ] && | |
|   wC <= MaxTsSize && hC <= MaxTsSize && !cu_sbt_flag ) | |
|   transform_skip_flag[ xC ][ yC ][ 2 ] | |
| if( !transform_skip_flag[ xC ][ yC ][ 2 ] ) | |
|   residual_coding( xC, yC, Log2( wC ), Log2( hC ), 2 ) | |
| else | |
|   residual_ts_coding( xC, yC, Log2( wC ), Log2( hC ), 2 ) | |
| } | |

FIG. 15

| sequence_parameter_set_rbsp() { | |
|---|---|
| ... | |
| sps_transform_skip_enabled_flag | u(1) |
| if( sps_transform_skip_enabled_flag ) | |
| sps_bdpcm_enabled_flag | u(1) |
| sps_ts_residual_coding_use_flag | u(1) |
| ... | |

FIG. 16

| | Descriptor |
|---|---|
| transform_unit( x0, y0, tbWidth, tbHeight, treeType, subTuIndex, chType ) { | |
| ... | |
| if( tu_cbf_luma[ x0 ][ y0 ] ) { | |
| transform_mode( x0, y0, tbWidth, tbHeight, 0 ) | |
| if( !(transform_skip_flag[ x0 ][ y0 ][ 0 ] ==IS_TS && sps_ts_residual_coding_use_flag) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ x0 ][ y0 ] ) | |
| transform_mode( x0, y0, wC, wH, 1 ) | |
| if( !(transform_skip_flag[ x0 ][ y0 ][ 1 ] ==IS_TS && sps_ts_residual_coding_use_flag) ) | |
| residual_coding( xC, yC, Log2( wC ), Log2( hC ), 1 ) | |
| else | |
| residual_ts_coding( xC, yC, Log2( wC ), Log2( hC ), 1 ) | |
| if( tu_cbf_cr[ x0 ][ y0 ] && | |
| !( tu_cbf_cb[ x0 ][ y0 ] && tu_joint_cbcr_residual_flag[ x0 ][ y0 ] )) { | |
| transform_mode( x0, y0, wC, hC, 2 ) | |
| if( !(transform_skip_flag[ x0 ][ y0 ][ 2 ] ==IS_TS && sps_ts_residual_coding_use_flag) ) | |
| residual_coding( xC, yC, Log2( wC ), Log2( hC ), 2 ) | |
| else | |
| residual_ts_coding( xC, yC, Log2( wC ), Log2( hC ), 2 ) | |
| } | |

FIG. 17 sps_ts_residual_coding_use_flag equal to 1 specifies that ts_residual_coding is used for residual coding when transform_skip_flag corresponding to component_id is equal to "tS_SKIP".
sps_ts_residual_coding_use_flag equal to 0 specifies that ts_residual_coding is not used for residual coding when transform_skip_flag corresponding to component_id is equal to "tS_SKIP".

"tS_SKIP" means "transform skip is used"

FIG. 18

| sequence_parameter_set_rbsp(){ | | | |
|---|---|---|---|
| ... | | | |
| sps_transform_skip_enabled_flag | | u(1) | |
| if( sps_transform_skip_enabled_flag ) | | | |
| sps_bdpcm_enabled_flag | | u(1) | |
| sps_ts_residual_coding_use_for_bdpcm_flag | | u(1) | |
| ... | | | |

FIG. 19

| | Descriptor |
|---|---|
| transform_unit( x0, y0, tbWidth, tbHeight, treeType, subTuIdex, chType ) { | |
| ... | |
| if( tu_cbf_luma[ x0 ][ y0 ] ) { | |
|   transform_mode( x0, y0, tbWidth, tbHeight, 0 ) | |
|   if( !(transform_skip_flag[ x0 ][ y0 ][ 0 ] == tS_TS ) || ( intra_bdpcm_flag && | |
|   sps_ts_residual_coding_use_for_bdpcm_flag==0) ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ x0 ][ y0 ] ) { | |
|   transform_mode( x0, y0, wC, hC, 1 ) | |
|   if( !(transform_skip_flag[ x0 ][ y0 ][ 1 ] == tS_TS ) || ( intra_bdpcm_chorma_flag && | |
|   sps_ts_residual_coding_use_for_bdpcm_flag==0) ) | |
|     residual_coding( xC, yC, Log2( wC ), Log2( hC ), 1 ) | |
|   else | |
|     residual_ts_coding( xC, yC, Log2( wC ), Log2( hC ), 1 ) | |
| if( tu_cbf_cr[ x0 ][ y0 ] && | |
|   !( tu_cbf_cb[ x0 ][ y0 ] && tu_joint_cbcr_residual_flag[ x0 ][ y0 ] ) ) { | |
|   transform_mode( x0, y0, wC, hC, 2 ) | |
|   if( !(transform_skip_flag[ x0 ][ y0 ][ 2 ] == tS_TS ) || ( intra_bdpcm_chorma_flag && | |
|   sps_ts_residual_coding_use_for_bdpcm_flag==0) ) | |
|     residual_coding( xC, yC, Log2( wC ), Log2( hC ), 2 ) | |
|   else | |
|     residual_ts_coding( xC, yC, Log2( wC ), Log2( hC ), 2 ) | |
| } | |
| } | |

FIG. 20 sps_ts_residual_coding_use_for_bdpcm_flag equal to 1 specifies that ts_residual_coding is used for residual coding when bdpcm mode is used. sps_ts_residual_coding_use_for_bdpcm_flag equal to 0 specifies that ts_residual_coding is not used for residual coding when bdpcm mode is used.

FIG. 25

The quantization parameter qP is derived as follows:
- If cIdx is equal to 0 and transform_skip_flag[ xTbY ][ yTbY ][ 0 ] is equal to 0, the following applies:
  qP = Qp'_Y
- Otherwise, if cIdx is equal to 0 (and transform_skip_flag[ xTbY ][ yTbY ][ 0 ] is equal to 1), the following applies:
  qP = Max( QpPrimeTsMin, Qp'_Y )
- Otherwise, if TuCResMode[ xTbY ][ yTbY ][ 0 ] is equal to 2, the following applies:
  qP = (transform_skip_flag[ xTbY ][ yTbY ][ 1 ] != IS_SKIP) ? Qp'_CbCr : Max( QpPrimeTsMin, Qp'_CbCr )
- Otherwise, if cIdx is equal to 1, the following applies:
  qP = (transform_skip_flag[ xTbY ][ yTbY ][ 1 ] != IS_SKIP) ? Qp'_Cb : Max( QpPrimeTsMin, Qp'_Cb )
- Otherwise (cIdx is equal to 2), the following applies:
  qP = (transform_skip_flag[ xTbY ][ yTbY ][ 2 ] != IS_SKIP) ? Qp'_Cr : Max( QpPrimeTsMin, Qp'_Cr )

The variable rectNonTsFlag is derived as follows:
rectNonTsFlag = ( ( ( Log2( nTbW ) + Log2( nTbH ) ) & 1 ) == 1 &&
  transform_skip_flag[ xTbY ][ yTbY ][ cIdx ] == 0 )

The variables bdShift, rectNorm and bdOffset are derived as follows:
bdShift = BitDepth + ( ( rectNonTsFlag ? 1 : 0 ) +
  ( Log2( nTbW ) + Log2( nTbH ) ) / 2 ) 75 + dep_quant_enabled_flag bdOffset = ( 1 << bdShift ) >> 1

FIG. 26

The variable ctxInc is derived as follows:
- If transform_skip_flag[ xS ][ yS ][ cIdx ] is equal to 1, the following applies:
  ctxInc = 90 + locSumSig
- Otherwise (transform_skip_flag[ xS ][ yS ][ cIdx ] is equal to 1), the following applies:
  - If cIdx is equal to 0, ctxInc is derived as follows:
    ctxInc = 12 * Max( 0, QState ? 1 ) + Min( ( locSumAbsPass1 + 1 ) >> 1, 3 ) +
    ( d < 2 ? 8 : ( d < 5 ? 4 : 0 ) )
  - Otherwise (cIdx is greater than 0), ctxInc is derived as follows:
    ctxInc = 36 + 8 * Max( 0, QState ? 1) + Min( ( locSumAbsPass1 + 1 ) >> 1, 3 ) + ( d < 2 ? 4 : 0 )

FIG. 27

- The variable csbfCtx is initialized with 0 and modified as follows:
  - If transform_skip_flag[ xS ][ yS ][ cIdx ] is equal to 1, the following applies:
    - When xS is greater than 0, csbfCtx is modified as follows:
      csbfCtx += coded_sub_block_flag[ xS ?1 ][ yS ]
    - When yS is greater than 0, csbfCtx is modified as follows:
      csbfCtx += coded_sub_block_flag[ xS ][ yS ?1 ]
  - Otherwise (transform_skip_flag[ xS ][ yS ][ cIdx ] is equal to 0), the following applies:
    - When xS is less than ( 1 << ( log2TbWidth ? log2SbWidth ) ) ? 1, csbfCtx is modified as follows:
      csbfCtx += coded_sub_block_flag[ xS + 1 ][ yS ]
    - When yS is less than ( 1 << ( log2TbHeight ? log2SbHeight ) ) ? 1, csbfCtx is modified as follows:
      csbfCtx += coded_sub_block_flag[ xS ][ yS + 1 ]

The context index increment ctxInc is derived using the colour component index cIdx and csbfCtx as follows:
- If transform_skip_flag[ xS ][ yS ][ cIdx ] is equal to 1, the following applies:
  ctxInc = 4 + csbfCtx
- Otherwise (transform_skip_flag[ xS ][ yS ][ cIdx ] is equal to 0), the following applies:
  - If cIdx is equal to 0, ctxInc is derived as follows:
    ctxInc = Min( csbfCtx, 1 )
  - Otherwise (cIdx is greater than 0), ctxInc is derived as follows:
    ctxInc = 2 + Min( csbfCtx, 1 )

FIG. 28

| Syntax element | binIdx | | | | | |
| --- | --- | --- | --- | --- | --- | --- |
| | 0 | 1 | 2 | 3 | 4 | >= 5 |
| coeff_sign_flag[ ]<br>transform_skip_flag( x0 )( y0 )[ cIdx ] == 0 | bypass | na | na | na | na | na |
| coeff_sign_flag[ ]<br>transform_skip_flag( x0 )( y0 )[ cIdx ] == 1 | ( MaxCcbs > 0 ) ? ( 0.5 ) : bypass | na | na | na | na | na |

IMAGE PROCESSING DEVICE, BIT STREAM GENERATION METHOD, COEFFICIENT DATA GENERATION METHOD, AND QUANTIZATION COEFFICIENT GENERATION METHOD

CROSS-REFERENCE TO RELATED APPLICATIONS

The present application is based on PCT filing PCT/JP2020/044151, filed Nov. 27, 2020, which claims priority to Japanese Application No. 2019-223601, filed Dec. 11, 2019, the entire contents of each are incorporated herein by reference.

TECHNICAL FIELD

The present disclosure relates to an image processing device, a bit stream generation method, a coefficient data generation method, and a quantization coefficient generation method, and particularly relates to an image processing device, a bit stream generation method, a coefficient data generation method, and a quantization coefficient generation method capable of suppressing reduction in encoding efficiency.

BACKGROUND ART

Conventionally, there has been proposed, in image encoding, a method of performing encoding by skipping (omitting) transform processing of transforming a residual between an image and a predicted image thereof into coefficient data (for example, Non-Patent Document 1).

CITATION LIST

Non-Patent Document

Non-Patent Document 1: Benjamin Bross, Jianle Chen, Shan Liu, "Versatile Video Coding (Draft 5)", JVET-N1001-v10, Joint Video Experts Team (JVET) of ITU-T SG 16 WP 3 and ISO/IEC JTC 1/SC 29/WG 11 14th Meeting: Geneva, CH, 19-27 Mar. 2019

SUMMARY OF THE INVENTION

Problems to be Solved by the Invention

However, in the case of the method described in Non-Patent Document 1, this mode of transform skip is applied only to luminance components (luminance transform skip). That is, this transform skip mode cannot be applied to chrominance components. Therefore, there has been a possibility of reduction in encoding efficiency.

The present disclosure has been made in view of such a situation, and an object thereof is to make it possible to suppress reduction in encoding efficiency.

Solutions to Problems

An image processing device according to one aspect of the present technology is an image processing device including a flag generation unit that generates a transform skip flag that is flag information indicating, for each component, whether or not to skip transform processing of transforming a residual between an image and a predicted image of the image into coefficient data in encoding of the image, a flag encoding unit that encodes the transform skip flag generated by the flag generation unit and generates coded data of the transform skip flag, and a bit stream generation unit that generates a bit stream including the coded data of the transform skip flag generated by the flag encoding unit.

A bit stream generation method according to one aspect of the present technology is a bit stream generation method including generating a transform skip flag that is flag information indicating, for each component, whether or not to skip transform processing of transforming a residual between an image and a predicted image of the image into coefficient data in encoding of the image, encoding the transform skip flag generated and generating coded data of the transform skip flag, and generating a bit stream including the coded data of the transform skip flag generated.

An image processing device according to another aspect of the present technology is an image processing device including a quantization parameter correction unit that, in a case where a transform skip flag corresponding to a component identifier indicates a transform skip for skipping transform processing for transforming a residual between an image and a predicted image of the image into a transform coefficient in encoding the image, corrects a quantization parameter to be applied to a processing target transform block corresponding to the component identifier, and a quantization unit that performs quantization of the processing target transform block corresponding to the component identifier by using the quantization parameter corrected by the quantization parameter correction unit.

A quantization coefficient generation method according to another aspect of the present technology is a quantization coefficient generation method including correcting, in a case where a transform skip flag corresponding to a component identifier indicates a transform skip for skipping transform processing for transforming a residual between an image and a predicted image of the image into a transform coefficient in encoding the image, a quantization parameter to be applied to a processing target transform block corresponding to the component identifier, and performing quantization of the processing target transform block corresponding to the component identifier by using the quantization parameter corrected, and generating a quantization coefficient corresponding to the component identifier.

An image processing device according to still another aspect of the present technology is an image processing device including a flag decoding unit that decodes coded data of a transform skip flag corresponding to a component identifier and obtains the transform skip flag corresponding to the component identifier, a mode control unit that controls, on the basis of the transform skip flag corresponding to the component identifier obtained by the flag decoding unit, whether a decoding mode of coded data of coefficient data corresponding to the component identifier is set to a TS residual decoding mode that is a mode for a case of skipping inverse transform processing of transforming coefficient data into a residual between an image and a predicted image, or set to a non-TS residual decoding mode that is a mode for a case of not skipping the inverse transform process, and a coefficient data decoding unit that decodes the coded data of the coefficient data corresponding to the component identifier according to the decoding mode set by the mode control unit, and generates the coefficient data corresponding to the component identifier.

A coefficient data generation method according to still another aspect of the present technology is a coefficient data generation method including decoding coded data of a transform skip flag corresponding to a component identifier and obtaining the transform skip flag corresponding to the component identifier, controlling, on the basis of the transform skip flag corresponding to the component identifier obtained, whether a decoding mode of coded data of coefficient data corresponding to the component identifier is set to a TS residual decoding mode that is a mode for a case of skipping inverse transform processing of transforming coefficient data into a residual between an image and a predicted image, or set to a non-TS residual decoding mode that is a mode for a case of not skipping the inverse transform process, and decoding the coded data of the coefficient data corresponding to the component identifier according to the decoding mode set, and generating the coefficient data corresponding to the component identifier.

An image processing device according to still another aspect of the present technology is an image processing device including a quantization parameter correction unit that, in a case where a transform skip flag corresponding to a component identifier indicates a transform skip for skipping inverse transform processing of transforming coefficient data into a residual between an image and a predicted image, corrects a quantization parameter to be applied to a processing target transform block corresponding to the component identifier, and an inverse quantization unit that performs inverse quantization of a processing target transform block corresponding to the component identifier by using the quantization parameter corrected by the quantization parameter correction unit.

A coefficient data generation method according to still another aspect of the present technology is a coefficient data generation method including correcting, in a case where a transform skip flag corresponding to a component identifier indicates a transform skip for skipping inverse transform processing of transforming coefficient data into a residual between an image and a predicted image, a quantization parameter to be applied to a processing target transform block corresponding to the component identifier, and performing inverse quantization of a processing target transform block corresponding to the component identifier by using the quantization parameter corrected, and generates the coefficient data corresponding to the component identifier.

In the image processing device and the bit stream generation method according to one aspect of the present technology, a transform skip flag that is flag information indicating, for each component, whether or not to skip transform processing of transforming a residual between an image and a predicted image of the image into coefficient data in encoding of the image is generated, the transform skip flag generated is encoded, coded data of the transform skip flag is generated, and a bit stream including the coded data of the transform skip flag generated is generated.

In the image processing device and the quantization coefficient generation method according to another aspect of the present technology, in a case where a transform skip flag corresponding to a component identifier indicates a transform skip for skipping transform processing for transforming a residual between an image and a predicted image of the image into a transform coefficient in encoding the image, a quantization parameter to be applied to a processing target transform block corresponding to the component identifier is corrected, and quantization of the processing target transform block corresponding to the component identifier is performed by using the quantization parameter corrected, and a quantization coefficient corresponding to the component identifier is generated.

In the image processing device and the coefficient data generation method according to still another aspect of the present technology, coded data of a transform skip flag corresponding to a component identifier is decoded, the transform skip flag corresponding to the component identifier is obtained, whether a decoding mode of coded data of coefficient data corresponding to the component identifier is set to a TS residual decoding mode that is a mode for a case of skipping inverse transform processing of transforming coefficient data into a residual between an image and a predicted image, or set to a non-TS residual decoding mode that is a mode for a case of not skipping the inverse transform process, is controlled on the basis of the transform skip flag corresponding to the component identifier obtained, the coded data of the coefficient data corresponding to the component identifier is decoded according to the set decoding mode, and the coefficient data corresponding to the component identifier is generated.

In the image processing device and the coefficient data generation method according to still another aspect of the present technology, in a case where a transform skip flag corresponding to a component identifier indicates a transform skip for skipping inverse transform processing of transforming coefficient data into a residual between an image and a predicted image, a quantization parameter to be applied to a processing target transform block corresponding to the component identifier is corrected, inverse quantization of a processing target transform block corresponding to the component identifier is performed by using the quantization parameter corrected, and the coefficient data corresponding to the component identifier is generated.

BRIEF DESCRIPTION OF DRAWINGS

FIG. 1 is a diagram describing extension of transform skip.

FIG. 2 is a block diagram illustrating a main configuration example of an image encoding device.

FIG. 10 is a diagram illustrating an example of syntax of a TU.

FIG. 11 is a diagram illustrating an example of syntax of transform mode information.

FIG. 12 is a diagram illustrating an example of syntax of a TS residual encoding mode.

FIG. 13 is a diagram illustrating an example of semantics of transform mode information.

FIG. 14 is a diagram illustrating another example of syntax of transform mode information.

FIG. 15 is a diagram illustrating an example of syntax of a sequence parameter set.

FIG. 16 is a diagram illustrating an example of syntax of the TU.

FIG. 17 is a diagram illustrating an example of semantics of a sequence parameter set.

FIG. 18 is a diagram illustrating an example of syntax of the sequence parameter set.

FIG. 19 is a diagram illustrating an example of syntax of the TU.

FIG. 20 is a diagram illustrating an example of semantics of the sequence parameter set.

FIG. 25 is a diagram illustrating an example of syntax of a quantization parameter.

FIG. 26 is a diagram illustrating an example of syntax of a context variable.

FIG. 27 is a diagram illustrating an example of syntax of the context variable.

FIG. 28 is a diagram describing switching of a sign coding mode.

MODE FOR CARRYING OUT THE INVENTION

Figure 3:
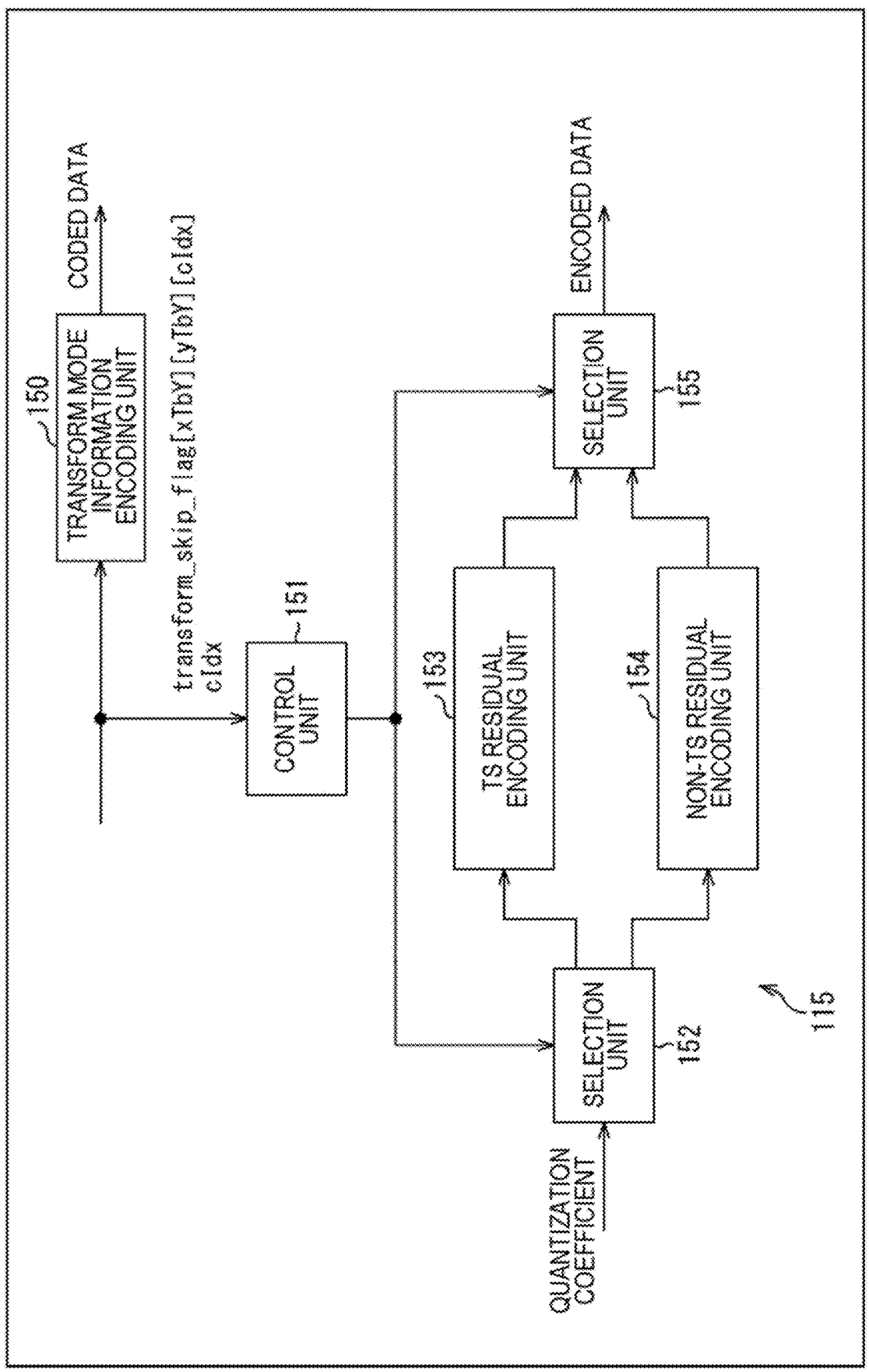
FIG. 3 is a block diagram illustrating a main configuration example of an encoding unit.

Hereinafter, modes for carrying out the present disclosure (hereinafter referred to as embodiments) will be described. Note that the description will be made in the following order.
1. Documents and the like supporting technical contents and technical terms
2. Transform skip
3. First embodiment (extension of transform skip)
4. Second embodiment (correction of quantization parameter)
5. Third embodiment (sharing of context variable)
6. Fourth embodiment (control of encoding-decoding mode of sign code)
7. Appendix

1. DOCUMENTS AND THE LIKE SUPPORTING TECHNICAL CONTENTS AND TECHNICAL TERMS

The scope disclosed in the present technology includes not only the contents described in the embodiments but also the contents described in the following non-patent documents known at the time of filing.

Non-Patent Document 1: (described above)

Non-Patent Document 2: Takeshi Tsukuba, Masaru Ikeda, Yoichi Yagasaki, Teruhiko Suzuki, "CE8: Chroma Transform Skip (CE8-3.2)", JVET-O0081-v2, Joint Video Experts Team (JVET) of ITU-T SG 16 WP 3 and ISO/IEC JTC 1/SC 29/WG 11 15th Meeting: Gothenburg, SE, 3-12 Jul. 2019

Non-Patent Document 3: Tung Nguyen, Benjamin Bross, Heiko Schwarz, Detlev Marpe, Thomas Wiegand, "Non-CE8: Minimum Allowed QP for Transform Skip Mode", JVET-O0405-v1, Joint Video Experts Team (JVET) of ITU-T SG 16 WP 3 and ISO/IEC JTC 1/SC 29/WG 11 15th Meeting: Gothenburg, SE, 3-12 Jul. 2019

Non-Patent Document 4: Jianle Chen, Yan Ye, Seung Hwan Kim, "Algorithm description for Versatile Video Coding and Test Model 6 (VTM 6)", JVET-O2002-v2, Joint Video Experts Team (JVET), of ITU-T SG 16 WP 3 and ISO/IEC JTC 1/SC 29/WG 11 15th Meeting: Gothenburg, SE, 3-12 Jul. 2019

Non-Patent Document 5: Takeshi Tsukuba, Masaru Ikeda, Yoichi Yagasaki, Teruhiko Suzuki, "CE8-2.1: Transform Skip for Chroma with limiting maximum number of context-coded bin in TS residual coding", JVET-P0058-v1, Joint Video Experts Team (JVET) of ITU-T SG 16 WP 3 and ISO/IEC JTC 1/SC 29/WG 11 16th Meeting: Geneva, CH, 1-11 Oct. 2019

Non-Patent Document 6: Gordon Clare, Felix Henry, Takeshi Tsukuba, Masaru Ikeda, Yoich Yagasaki, Teruhiko Suzuki, "CE8-4.1: BDPCM and Transform skip for Chroma", JVET-P0059-v1, Joint Video Experts Team (JVET) of ITU-T SG 16 WP 3 and ISO/IEC JTC 1/SC 29/WG 11 16th Meeting: Geneva, CH, 1-11 Oct. 2019

Non-Patent Document 7: TELECOMMUNICATION STANDARDIZATION SECTOR OF ITU (International Telecommunication Union), "Advanced video coding for generic audiovisual services", H.264, April 2017

Non-Patent Document 8: TELECOMMUNICATION STANDARDIZATION SECTOR OF ITU (International Telecommunication Union), "High efficiency video coding", H.265, December 2016

That is, the contents described in the above-mentioned non-patent documents are also the basis for determining the support requirements. For example, even in a case where the quad-tree block structure and the quad tree plus binary tree (QTBT) block structure described in the above-described non-patent documents are not directly described in the embodiments, they are within the scope of disclosure of the present technology and are assumed to satisfy the support requirements of the claims. Furthermore, for example, technical terms such as parsing, syntax, and semantics are also within the scope of disclosure of the present technology even in a case where there is no direct description in the embodiments, and are assumed to meet the support requirements of the claims.

Furthermore, in the present description, a "block" (not a block indicating a processing unit) used in the description as a partial area of an image (picture) or a processing unit indicates any partial area in the picture unless otherwise specified, and does not limit its size, shape, characteristics, and the like. For example, the "block" includes any partial region (processing unit) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a transform block, a sub-block, a macroblock, a tile, or a slice described in the above-described non-patent document.

Furthermore, upon specifying the size of such a block, not only the block size may be directly specified, but also the block size may be indirectly specified. For example, the block size may be specified using identification information that identifies the size. Furthermore, for example, the block size may be specified by a ratio or difference with the size of the reference block (for example, LCU, SCU, or the like). For example, in a case of transmitting information for specifying the block size as a syntax element or the like, information for indirectly specifying the size as described above may be used as this information. In this manner, the amount of information of the information can be reduced, and encoding efficiency may be improved. Furthermore, the specification of the block size also includes a specification of the range of the block size (for example, the specification of the range of an allowable block size, or the like).

Furthermore, in the present description, encoding includes not only the entire process of transforming an image into a bit stream but also a part of the process. For example, the encoding includes not only processing including prediction processing, orthogonal transform, quantization, arithmetic coding, and the like, but also processing collectively including the quantization and the arithmetic coding, processing including the prediction processing, the quantization, and the arithmetic coding, and the like. Similarly, the decoding includes not only the entire process of transforming a bit stream into an image but also a part of the process. For example, the processing includes not only processing including inverse arithmetic decoding, inverse quantization, inverse orthogonal transform, prediction processing, and the like, but also processing including the inverse arithmetic decoding and the inverse quantization, processing including the inverse arithmetic decoding, the inverse quantization, and the prediction processing, and the like.

2. TRANSFORM SKIP

<Transform Skip of Luminance Component>

Conventionally, in encoding a still image and a moving image, an image input to an encoding device is generally a color image having a luminance component and a color component (which may include a chrominance component). In such image encoding, for example, as described in Non-Patent Document 1, a method of performing encoding by skipping (omitting) transform processing of transforming a residual between an image and a predicted image thereof into coefficient data for a luminance component has been considered.

However, this transform skip mode cannot be applied to the color component. Accordingly, in screen content or the like in which transform skip is effective, encoding efficiency of color components may be reduced.

<Extension of Transform Skip Flag>

Accordingly, the transform skip is extended so that the transform skip can be set for each component (each luminance component and each color component), and the transform skip can be performed not only for the luminance component but also for the color component. For example, in a case of an image encoding and decoding method described in non-patent document described above, setting of skip can be indicated by a transform skip flag (transform_skip_flag). Furthermore, the component can be indicated by a component identifier (cIdx). Thus, for example, as in method 1 described in the top row of a table in FIG. 1, the value of the transform skip flag is set in association with the value of the component identifier.

For example, an image processing device includes a flag generation unit that generates a transform skip flag that is flag information indicating, for each component, whether or not to skip transform processing of transforming a residual between an image and a predicted image of the image into coefficient data in encoding of the image, a flag encoding unit that encodes the transform skip flag generated by the flag generation unit and generates coded data of the transform skip flag, and a bit stream generation unit that generates a bit stream including the coded data of the transform skip flag generated by the flag encoding unit.

Furthermore, for example, at the time of generating a bit stream, a transform skip flag that is flag information indicating, for each component, whether or not to skip transform processing of transforming a residual between an image and a predicted image of the image into coefficient data in encoding of the image is generated, the generated transform skip flag is encoded, coded data of the transform skip flag is generated, and a bit stream including the coded data of the generated transform skip flag is generated.

In this manner, the setting of the transform skip for each component can be provided to the decoding side. Therefore, in a case where the transform skip is applied to the color components, the decoding side can correctly decode the bit stream. Therefore, reduction in encoding efficiency can be suppressed as compared with a case where the transform skip can be applied only to the luminance components.

Then, the transform skip flag may be acquired on the decoding side.

For example, the image processing device may include a flag decoding unit that decodes coded data of a transform skip flag corresponding to a component identifier and obtains the transform skip flag corresponding to the component identifier.

Furthermore, for example, when the coefficient data is generated, the coded data of the transform skip flag corresponding to the component identifier may be decoded to obtain the transform skip flag corresponding to the component identifier.

In this manner, when decoding, the setting of the transform skip for each component indicated by the transform skip flag can be applied. Therefore, the bit stream of the color components to which the transform skip is applied can be correctly decoded. Therefore, reduction in encoding efficiency can be suppressed as compared with a case where the transform skip can be applied only to the luminance components.

Furthermore, when encoding the image, transform processing of the color components may be controlled on the basis of the setting of the transform skip for each component by the above-described transform skip flag. That is, the transform skip may be applied to the transform processing of the color components. In this manner, reduction in encoding efficiency can be suppressed as compared with a case where the transform skip can be applied only to the luminance components.

Similarly, at the time of decoding the coded data of the image, inverse transform processing of transforming the coefficient data of the color component into the residual between the image and the predicted image may be controlled on the basis of the setting of the transform skip for each component by the above-described transform skip flag. That is, the transform skip may be applied to the inverse transform processing of the color components. In this manner, the bit stream of the color components to which the transform skip is applied can be correctly decoded. Therefore, reduction in encoding efficiency can be suppressed as compared with a case where the transform skip can be applied only to the luminance components.

Note that, as described above, by setting the transform skip for each component, it is possible to set the transform skip for the color components independently of the luminance components. Therefore, it is possible to set the transform skip for the color components according to whether or not the transform skip is valid for the color components. In this manner, reduction in encoding efficiency can be suppressed as compared with a case where setting of the transform skip for the luminance components is applied to the color components.

<Control of Encoding Mode>

Furthermore, in the case of the method described in Non-Patent Document 1, an encoding mode (decoding mode) of the coefficient data of the luminance components is controlled according to the presence or absence of the transform skip. For example, in a case where the transform skip is performed, the coefficient data of the luminance components is encoded in the TS residual encoding mode optimized for the coefficient data for which the transform skip has been performed (the coded data of the coefficient data of the luminance components is decoded in the TS residual decoding mode optimized to transform-skipped coefficient data). On the other hand, in a case where the transform skip is not performed, the coefficient data of the luminance components is encoded in the non-TS residual encoding mode optimized for the coefficient data on which the transform processing has been performed (the coded data of the coefficient data of the luminance components is decoded in the non-TS residual decoding mode optimized to the coefficient data on which the transform processing has been performed).

However, since the transform skip is not applied to the chrominance components, such control of the encoding mode (decoding mode) has not been performed. Thus, in a case where the transform skip is applied to the color components as described above, the encoding efficiency may be reduced as compared with a case where such control of the encoding mode (decoding mode) is performed.

Accordingly, in a case where the transform skip is applied to the color components as in the above-described method 1, such control of the encoding mode (decoding mode) may also be applied. For example, as in method 1-1 described in the second row from the top of the table in FIG. 1, in a case where the transform skip is applied to each value of the identifier of the component, the TS residual encoding mode (TS residual decoding mode) may be applied as the encoding mode (decoding mode), and in a case where the transform skip is not applied (in a case of the non-transform skip), the non-TS residual encoding mode (non-TS residual decoding mode) may be applied as the encoding mode (decoding mode).

For example, on the basis of the transform skip flag corresponding to a component identifier, whether an encoding mode of coefficient data corresponding to the component identifier is set to a TS residual encoding mode that is a mode for a case of skipping the transform processing or a non-TS residual encoding mode that is a mode for a case of not skipping the transform processing may be controlled, and coefficient data corresponding to the component identifier may be encoded by the encoding mode set as described above and generates coded data of the coefficient data.

Furthermore, for example, on the basis of the transform skip flag corresponding to the component identifier, whether the decoding mode of the coded data of the coefficient data corresponding to the component identifier is set to the TS residual decoding mode that is a mode for a case of skipping the inverse transform processing of transforming the coefficient data into residuals between the image and the predicted image, or to the non-TS residual decoding mode that is a mode for a case of not skipping the inverse transform processing may be controlled to decode the coded data of the coefficient data corresponding to the component identifier by the decoding mode set as described above, and to generate the coefficient data corresponding to the component identifier.

In this manner, since the encoding mode (decoding mode) according to the setting of the transform skip can be applied, reduction in encoding efficiency can be suppressed as compared with a case where encoding (decoding) is performed in a single encoding mode (decoding mode).

<Transform Skip Residual Encoding Use Flag>

A flag indicating selection between the TS residual encoding mode (TS residual decoding mode) and the non-TS residual encoding mode (non-TS residual decoding mode) may be applied. For example, a residual encoding mode selection flag (also referred to as a transform skip residual encoding use flag) indicating selection setting of the encoding mode may be applied as in method 1-1-1 described in the third row from the top of the table in FIG. 1.

For example, when encoding, the transform skip residual encoding use flag that is flag information indicating whether to apply the TS residual encoding mode or the non-TS residual encoding mode may be generated, the transform skip residual encoding use flag may be encoded, and a bit stream including coded data of the transform skip residual encoding use flag may be generated.

Furthermore, when decoding, the coded data of the transform skip residual encoding use flag may be decoded to generate the transform skip residual encoding use flag corresponding to the component identifier, and whether the decoding mode of the coded data of the coefficient data corresponding to the component identifier is set to the TS residual decoding mode or the non-TS residual decoding mode may be controlled on the basis of the transform skip residual encoding use flag corresponding to the component identifier.

For example, such a transform skip residual encoding use flag may be set at a high level of a sequence parameter or the like. In this manner, even an encoder or a decoder that does not support the transform skip can correctly perform encoding and decoding on the basis of this flag. Therefore, reduction in encoding efficiency can be suppressed. In other words, implementation of the TS residual encoding mode (TS residual decoding mode) in the encoder and the decoder can be omitted, and increase in the circuit scale can be suppressed.

<Transform Skip Residual Encoding Use Specifying Mode Flag>

A flag indicating whether to apply the TS residual encoding mode (TS residual decoding mode) or to apply the non-TS residual encoding mode (non-TS residual decoding mode) in a specific mode may be applied. For example, as in method 1-1-2 described in the fourth row from the top of the table in FIG. 1, a flag (also referred to as a transform skip residual encoding use specifying mode flag) that enables selection of the encoding mode in the specific mode may be applied.

For example, when encoding, a transform skip residual encoding use specifying mode flag that is flag information indicating whether to apply the TS residual encoding mode or the non-TS residual encoding mode in a specific mode may be generated, the transform skip residual encoding use specifying mode flag may be encoded, and a bit stream including coded data of the transform skip residual encoding use specifying mode flag may be generated.

Furthermore, when decoding, the coded data of the transform skip residual encoding use specifying mode flag may be decoded, the transform skip residual encoding use specifying mode flag corresponding to the component identifier may be generated, and whether the decoding mode of the coded data of the coefficient data corresponding to the component identifier is set to the TS residual decoding mode or the non-TS residual decoding mode may be controlled on the basis of the transform skip residual encoding use specifying mode flag corresponding to the component identifier.

For example, such a transform skip residual encoding use specifying mode flag may be set at a high level such as a sequence parameter. This enables switching between the TS residual decoding mode and the non-TS residual decoding mode in a specific mode.

Note that the foregoing method 1, method 1-1, method 1-1-1, and method 1-1-2 will be described later in the first embodiment.

<Correction of Quantization Parameter>

Non-Patent Document 3 proposes a method for clipping a quantization parameter QP applied to a luminance transform block to QP=4 or QP=QpPrimeTsMin (minimum TSQP) in a case of luminance transform skip, as a countermeasure against a possibility that a peak signal-to-noise ratio (PSNR) decreases when the quantization parameter QP<4 in the luminance transform block to which the luminance transform skip is applied.

In a case where the transform skip is applied to the color components, although there is similarly a possibility that the PSNR is reduced, conventionally the transform skip is not applied to the color components, and naturally such a point has not been considered.

Accordingly, for example, as in method 1-2 described in the fifth row from the top of the table in FIG. 1, the quantization parameter may be corrected in a case of the transform skip in each value of the component identifier. That is, in a case where the transform skip is applied, the quantization parameter may be corrected. Then, such control may be performed for each component.

For example, the image processing device may include a quantization parameter correction unit that, in a case where a transform skip flag corresponding to a component identifier indicates a transform skip in encoding an image, corrects a quantization parameter to be applied to a processing target transform block corresponding to the component identifier, and a quantization unit that performs quantization of the processing target transform block corresponding to the component identifier by using the quantization parameter corrected by the quantization parameter correction unit.

For example, in the quantization coefficient generation method, in a case where a transform skip flag corresponding to a component identifier indicates a transform skip in encoding an image, a quantization parameter to be applied to a processing target transform block corresponding to the component identifier may be corrected, quantization of the processing target transform block corresponding to the component identifier may be performed by using the quantization parameter corrected, and a quantization coefficient corresponding to the component identifier may be generated.

For example, the image processing device may include a quantization parameter correction unit that, in a case where a transform skip flag corresponding to a component identifier indicates a transform skip, corrects a quantization parameter to be applied to a processing target transform block corresponding to the component identifier, and an inverse quantization unit that performs inverse quantization of a processing target transform block corresponding to the component identifier by using the quantization parameter corrected by the quantization parameter correction unit.

For example, in a coefficient data generation method, in a case where a transform skip flag corresponding to a component identifier indicates a transform skip, a quantization parameter to be applied to a processing target transform block corresponding to the component identifier may be corrected, and inverse quantization of a processing target transform block corresponding to the component identifier may be performed by using the corrected quantization parameter, and generates the coefficient data corresponding to the component identifier.

In this manner, decrease in PSNR can be suppressed in the encoder or the decoder, or in both.

Note that, for example, in encoding, in a case where the transform skip flag corresponding to the component identifier indicates the transform skip, one having a larger value of a minimum quantization parameter for the transform skip and a quantization parameter corresponding to the component identifier may be set as the quantization parameter to be applied to the processing target transform block corresponding to the component identifier, and in a case where the transform skip flag corresponding to the component identifier indicates non-transform skip in which the transform skip is not performed, the quantization parameter corresponding to the component identifier may be set as the quantization parameter to be applied to the processing target transform block corresponding to the component identifier.

Furthermore, for example, in decoding, in a case where the transform skip flag corresponding to the component identifier indicates the transform skip, one having a larger value of a minimum quantization parameter for the transform skip and a quantization parameter corresponding to the component identifier may be set as the quantization parameter to be applied to the processing target transform block corresponding to the component identifier, and in a case where the transform skip flag corresponding to the component identifier indicates non-transform skip in which the transform skip is not performed, the quantization parameter corresponding to the component identifier may be set as the quantization parameter to be applied to the processing target transform block corresponding to the component identifier.

In this manner, decrease in PSNR can be suppressed in the encoder or the decoder, or in both.

Note that, for example, in decoding, coded data of the transform skip flag corresponding to the component identifier may be decoded, and in a case where the transform skip flag corresponding to the component identifier indicates the transform skip, the quantization parameter to be applied to the processing target transform block corresponding to the component identifier may be corrected.

In this manner, the correction of the quantization parameter can be controlled on the basis of the transform skip flag corresponding to the encoded component identifier.

The above method 1-2 will be described later in the second embodiment.

<Sharing of Context Variable>

Furthermore, as described above, in a case where the transform skip is introduced for the color components and the transform block of the color components to which the transform skip is applied is encoded by the TS residual encoding mode, if context variables independent of each other are used for the luminance components and the color components, it is necessary to newly add a context variable for the color components, and there is a possibility that the a memory capacity for holding the context variable increases and the cost of hardware increases.

Accordingly, for example, as in method 1-3 described in the sixth row from the top of the table in FIG. 1, in a case of the transform skip, the context variable corresponding to each binIdx in the bin row of each syntax may be shared between the luminance component and the color component.

For example, in a case where the transform processing is skipped in encoding, a context variable may be shared between encoding of a luminance component of the coefficient data and encoding of a chrominance component.

Furthermore, for example, in a case where the inverse transform processing is skipped in decoding, the context variable may be shared between decoding of coded data of the luminance component of the coefficient data and decoding of coded data of the chrominance component.

In this manner, it is possible to suppress increase in memory size for holding the context variable. Therefore, it is possible to suppress increase in hardware cost.

The above method 1-3 will be described later in the third embodiment.

<Control of Encoding-Decoding Mode of Sign Code>

Furthermore, for example, as in method 1-4 described in the seventh row from the top of the table in FIG. 1, an encoding and decoding method of a sign code may be switched according to the transform skip flag corresponding to the component identifier.

For example, as in method 1-4-1 described in the eighth stage from the top of the table in FIG. 1, in a case where the transform skip is not performed, bypass encoding-decoding may be applied to encoding-decoding of the sign code.

Furthermore, for example, as in method 1-4-2 described in the ninth row from the top of the table in FIG. 1, in the case of transform skip, if the number of remaining context encoding bins is equal to or larger than a threshold, context encoding-decoding may be applied to encoding-decoding of the sign code, or otherwise, bypass encoding-decoding may be applied to encoding-decoding of the sign code.

In this manner, reduction in encoding efficiency can be suppressed.

The foregoing method 1-4, method 1-4-1, and method 1-4-2 will be described later in the fourth embodiment.

3. FIRST EMBODIMENT

<3-1. Image Encoding Device>

The present technology described above can be applied to arbitrary devices, devices, systems, and the like. For example, the above-described present technology can be applied to an image encoding device that encodes image data.

FIG. 2 is a block diagram illustrating an example of a configuration of an image encoding device that is one aspect of an image processing device to which the present technology is applied. The image encoding device 100 illustrated in FIG. 2 is a device that encodes image data of a moving image. For example, the image encoding device 100 implements the technology described in at least one of the above-described non-patent documents, and encodes the image data of the moving image by a method conforming to the standard described in any of the documents.

Note that while FIG. 2 illustrates main elements such as processing units and data flows, the elements illustrated in FIG. 2 do not necessarily include all elements. That is, in the image encoding device 100, a processing unit not illustrated as a block in FIG. 2 may exist, and a process or data flow not illustrated as an arrow or the like in FIG. 2 may exist. This similarly applies to other drawings describing a processing unit and the like in the image encoding device 100.

As illustrated in FIG. 2, the image encoding device 100 includes a control unit 101, a rearrangement buffer 111, an operation unit 112, an orthogonal transform unit 113, a quantization unit 114, an encoding unit 115, and an accumulation buffer 116. Furthermore, the image encoding device 100 includes an inverse quantization unit 117, an inverse orthogonal transform unit 118, an operation unit 119, an in-loop filter unit 120, a frame memory 121, a prediction unit 122, and a rate control unit 123.

<Control Unit>

The control unit 101 divides moving image data held by the rearrangement buffer 111 into blocks (CU, PU, transform block, and the like) in units of processing on the basis of a block size in units of processing specified outside or in advance. Furthermore, the control unit 101 determines encoding parameters (header information Hinfo, prediction mode information Pinfo, transform information Tinfo, filter information Finfo, and the like) to be supplied to each block on the basis of, for example, rate-distortion optimization (RDO). For example, the control unit 101 can set a transform skip flag or the like.

Details of these encoding parameters will be described later. When determining the encoding parameters as described above, the control unit 101 supplies the encoding parameters to each block. Specifically, it is as follows.

The header information Hinfo is supplied to each block. The prediction mode information Pinfo is supplied to the encoding unit 115 and the prediction unit 122. The transform information Tinfo is supplied to the encoding unit 115, the orthogonal transform unit 113, the quantization unit 114, the inverse quantization unit 117, and the inverse orthogonal transform unit 118. The filter information Finfo is supplied to the in-loop filter unit 120.

<Rearrangement Buffer>

Each field (input image) of the moving image data is input to the image encoding device 100 in the reproduction order (display order). The rearrangement buffer 111 acquires and holds (stores) each input image in its reproduction order (display order). The rearrangement buffer 111 rearranges the input image in encoding order (decoding order) or divides the input image into blocks in units of processing on the basis of control of the control unit 101. The rearrangement buffer 111 supplies each processed input image to the operation unit 112.

<Operation Unit>

The operation unit 112 subtracts a predicted image P supplied from the prediction unit 122 from an image corresponding to the block of the processing unit supplied from the rearrangement buffer 111 to derive a predicted residual D, and supplies the predicted residual D to the orthogonal transform unit 113.

<Orthogonal Transform Unit>

The orthogonal transform unit 113 uses the predicted residual supplied from the operation unit 112 and the transform information Tinfo supplied from the control unit 101 as inputs, and performs orthogonal transform on the predicted residual on the basis of the transform information Tinfo to derive a transform coefficient Coeff. The orthogonal transform unit 113 supplies the obtained transform coefficient to the quantization unit 114.

<Quantization Unit>

The quantization unit 114 uses the transform coefficient supplied from the orthogonal transform unit 113 and the transform information Tinfo supplied from the control unit 101 as inputs, and scales (quantizes) the transform coefficient on the basis of the transform information Tinfo. Note that the quantization rate is controlled by the rate control unit 123. The quantization unit 114 supplies a quantized transform coefficient (also referred to as a quantized transform coefficient level) level obtained by such quantization to the encoding unit 115 and the inverse quantization unit 117.

<Encoding Unit>

The encoding unit 115 uses the quantized transform coefficient level supplied from the quantization unit 114, various encoding parameters (the header information Hinfo, the prediction mode information Pinfo, the transform information Tinfo, the filter information Finfo, and the like) supplied from the control unit 101, information regarding a filter such as a filter coefficient supplied from the in-loop filter unit 120, and information regarding an optimum prediction mode supplied from the prediction unit 122 as inputs.

The encoding unit 115 performs, for example, entropy encoding (lossless encoding) such as context-based adaptive binary arithmetic code (CABAC) or context-based adaptive variable length code (CAVLC) on the quantized transform coefficient level to generate a bit string (coded data).

Furthermore, the encoding unit 115 derives residual information Rinfo from the quantized transform coefficient level, encodes the residual information Rinfo, and generates a bit string.

Moreover, the encoding unit 115 includes information regarding the filter supplied from the in-loop filter unit 120 in the filter information Finfo, and includes information regarding the optimum prediction mode supplied from the prediction unit 122 in the prediction mode information Pinfo. Then, the encoding unit 115 encodes the above-described various encoding parameters (the header information Hinfo, the prediction mode information Pinfo, the transform information Tinfo, the filter information Finfo, and the like) to generate a bit string.

Furthermore, the encoding unit 115 multiplexes the bit strings of various types of information generated as described above to generate coded data. The encoding unit 115 supplies the coded data to the accumulation buffer 116.

<Accumulation Buffer>

The accumulation buffer 116 temporarily holds the coded data obtained by the encoding unit 115. The accumulation buffer 116 outputs the held coded data to the outside of the image encoding device 100 as, for example, a bit stream or the like at a predetermined timing. For example, the coded data is transmitted to a decoding side via an arbitrary recording medium, an arbitrary transmission medium, an arbitrary information processing device, or the like. That is, the accumulation buffer 116 is also a transmission unit that transmits coded data (bit stream).

<Inverse Quantization Unit>

The inverse quantization unit 117 performs processing related to inverse quantization. For example, the inverse quantization unit 117 uses the quantized transform coefficient level level supplied from the quantization unit 114 and the transform information Tinfo supplied from the control unit 101 as inputs, and scales (inversely quantizes) the value of the quantized transform coefficient level on the basis of the transform information Tinfo. Note that this inverse quantization is inverse processing of the quantization performed in the quantization unit 114. The inverse quantization unit 117 supplies a transform coefficient Coeff_IQ obtained by such inverse quantization to the inverse orthogonal transform unit 118. Note that since the inverse quantization unit 117 is similar to the inverse quantization unit on the decoding side (described later), the description (described later) to be given for the decoding side can be applied to the inverse quantization unit 117.

<Inverse Orthogonal Transform Unit>

The inverse orthogonal transform unit 118 performs processing related to inverse orthogonal transform. For example, the inverse orthogonal transform unit 118 uses the transform coefficient supplied from the inverse quantization unit 117 and the transform information Tinfo supplied from the control unit 101 as inputs, and performs inverse orthogonal transform on the transform coefficient on the basis of the transform information Tinfo to derive a predicted residual D'. Note that this inverse orthogonal transform is inverse processing of the orthogonal transform performed by the orthogonal transform unit 113. The inverse orthogonal transform unit 118 supplies the predicted residual obtained by such inverse orthogonal transform to the operation unit 119. Note that since the inverse orthogonal transform unit 118 is similar to an inverse orthogonal transform unit on the decoding side (described later), a description (described later) to be given for the decoding side can be applied to the inverse orthogonal transform unit 118.

<Operation Unit>

The operation unit 119 uses the predicted residual D' supplied from the inverse orthogonal transform unit 118 and the predicted image P supplied from the prediction unit 122 as inputs. The operation unit 119 adds the predicted residual and the predicted image corresponding to the predicted residual to derive a locally decoded image. The operation unit 119 supplies the derived locally decoded image to the in-loop filter unit 120 and the frame memory 121.

<In-Loop Filter Unit>

The in-loop filter unit 120 performs processing related to an in-loop filter process. For example, the in-loop filter unit 120 uses the locally decoded image supplied from the operation unit 119, the filter information Finfo supplied from the control unit 101, and the input image (original image) supplied from the rearrangement buffer 111 as inputs. Note that the information input to the in-loop filter unit 120 is arbitrary, and information other than these pieces of information may be input. For example, a prediction mode, motion information, a code amount target value, a quantization parameter QP, a picture type, information of a block (CU, CTU, and the like), and the like may be input to the in-loop filter unit 120 as necessary.

The in-loop filter unit 120 appropriately performs the filter process on the locally decoded image on the basis of the filter information Finfo. The in-loop filter unit 120 also takes the input image (original image) and other input information for the filter process as necessary.

For example, as described in Non-Patent Document 1, the in-loop filter unit 120 can apply four in-loop filters of a bilateral filter, a deblocking filter (DBF), an adaptive offset filter (sample adaptive offset (SAO)), and an adaptive loop filter (ALF) in this order. Note that which filter is applied and in which order the filter is applied are arbitrary and can be selected as appropriate.

Of course, the filter process performed by the in-loop filter unit 120 is arbitrary and is not limited to the above example. For example, the in-loop filter unit 120 may apply a Wiener filter or the like.

The in-loop filter unit 120 supplies the locally decoded image subjected to the filter process to the frame memory 121. Note that, for example, in a case where information regarding the filter, such as the filter coefficient, is transmitted to the decoding side, the in-loop filter unit 120 supplies the information regarding the filter to the encoding unit 115.

<Frame Memory>

The frame memory 121 performs processing related to storage of data related to an image. For example, the frame memory 121 takes the locally decoded image supplied from the operation unit 119 or the locally decoded image subjected to the filter process supplied from the in-loop filter unit 120 as an input, and holds (stores) the locally decoded image. Furthermore, the frame memory 121 reconstructs and holds a decoded image in each picture unit using the locally decoded image (stores the decoded image in a buffer in the frame memory 121). The frame memory 121 supplies the decoded image (or a part thereof) to the prediction unit 122 in response to a request from the prediction unit 122.

<Prediction Unit>

The prediction unit 122 performs processing related to generation of a predicted image. For example, the prediction unit 122 uses the prediction mode information Pinfo supplied from the control unit 101, the input image (original image) supplied from the rearrangement buffer 111, and the decoded image (or a part thereof) read from the frame memory 121 as inputs. The prediction unit 122 performs prediction processing such as inter prediction or intra prediction using the prediction mode information Pinfo and the input image (original image), performs prediction with reference to the decoded image as a reference image, performs motion compensation processing on the basis of the prediction result, and generates a predicted image. The prediction unit 122 supplies the generated predicted image to the operation unit 112 and the operation unit 119. Furthermore, the prediction unit 122 supplies information regarding the prediction mode selected by the above processing, that is, the optimum prediction mode, to the encoding unit 115 as necessary.

<Rate Control Unit>

The rate control unit 123 performs processing related to rate control. For example, the rate control unit 123 controls the rate of the quantization operation of the quantization unit 114 so that overflow or underflow does not occur on the basis of the code amount of the coded data accumulated in the accumulation buffer 116.

<Encoding Unit>

FIG. 3 is a block diagram illustrating a main configuration example of the encoding unit 115 in FIG. 2. As illustrated in FIG. 3, the encoding unit 115 includes a transform mode information encoding unit 150, a control unit 151, a selection unit 152, a TS residual encoding unit 153, a non-TS residual encoding unit 154, and a selection unit 155.

The transform mode information encoding unit 150 performs processing related to encoding of the transform mode information (transform_mode). This transform mode information is information regarding a mode of transform processing by the orthogonal transform unit 113. For example, the transform mode information may include a transform skip flag (transform_skip_flag[xTbY][yTbY][cIdx]), an identifier related to primary transform (mts_idx[xTbY][yTbY][cIdx]), and the like.

For example, the transform mode information encoding unit 150 can acquire the transform mode information supplied from the control unit 101. Furthermore, the transform mode information encoding unit 150 can encode the acquired transform mode information and generate coded data of the transform mode information. Moreover, the transform mode information encoding unit 150 can supply the coded data of the generated transform mode information to the accumulation buffer 116 (that is, can provide the coded data to the decoding side).

The control unit 151 performs processing related to control of the encoding mode. For example, the control unit 151 can acquire the transform mode information ((transform_skip_flag[xTbY][yTbY][cIdx]), mts_idx[xTbY][yTbY][cIdx], and the like) and the component identifier (cIdx) supplied from the control unit 101. Furthermore, the control unit 151 can switch between the TS residual encoding mode and the non-TS residual encoding mode as the encoding mode of the coefficient data (quantization coefficient) by controlling selection of the selection unit 152 or the selection unit 155 on the basis of the transform skip flag corresponding to the component identifier. For example, in a case where the transform skip is applied, the control unit 151 connects the selection unit 152 and the selection unit 155 to the TS residual encoding unit 153. Furthermore, for example, in a case where the transform skip is not applied (in a case where the transform processing is performed), the control unit 151 connects the selection unit 152 and the selection unit 155 to the non-TS residual encoding unit 154.

The selection unit 152 performs processing related to selection of a supply destination of the coefficient data (quantization coefficient). For example, the selection unit 152 can acquire the quantization coefficient supplied from the quantization unit 114. Furthermore, under control of the control unit 151, the selection unit 152 can supply the acquired quantization coefficient to the TS residual encoding unit 153 or the non-TS residual encoding unit 154 (the one designated by the control unit 151). For example, in a case where the transform skip is applied, the selection unit 152 supplies the quantization coefficient to the TS residual encoding unit 153. Furthermore, for example, in a case where the transform skip is not applied (in a case where the transform processing is performed), the selection unit 152 supplies the quantization coefficient to the non-TS residual encoding unit 154.

The TS residual encoding unit 153 performs processing related to a TS residual encoding mode. For example, the TS residual encoding unit 153 can acquire the quantization coefficient supplied from the selection unit 152. Furthermore, the TS residual encoding unit 153 can encode the acquired quantization coefficient in the TS residual encoding mode. The TS residual encoding mode is an encoding mode for a case of skipping the transform processing. For example, encoding in the TS residual encoding mode is optimized for the coefficient data from which the transform processing is skipped, for example, scanning is performed from the DC component of the coefficient data toward a high frequency component, or position information of a last coefficient is not transmitted to the decoding side. A more specific technique of the TS residual encoding mode is described in Non-Patent Document 4 and the like. The TS residual encoding unit 153 can encode the quantization coefficient in this manner and generate coded data of the quantization coefficient. The TS residual encoding unit 153 can supply the coded data generated in this manner to the selection unit 155.

The non-TS residual encoding unit 154 performs processing related to the non-TS residual encoding mode. For example, the non-TS residual encoding unit 154 can acquire the quantization coefficient supplied from the selection unit 152. Furthermore, the non-TS residual encoding unit 154 can encode the acquired quantization coefficient in the non-TS residual encoding mode. The non-TS residual encoding mode is an encoding mode for a case of performing transform processing. For example, the encoding in the non-TS residual encoding mode is optimized for the coefficient data on which the transform processing has been performed such that scanning is performed from the last coefficient of the coefficient data toward the DC component, or the position information of the last coefficient is transmitted to the decoding side. A more specific technique of the non-TS residual encoding mode is described in Non-Patent Document 4 and the like. The non-TS residual encoding unit 154 can encode the quantization coefficient in this manner and generate coded data of the quantization coefficient. The non-TS residual encoding unit 154 can supply the coded data generated in this manner to the selection unit 155.

The selection unit 155 performs processing related to selection of a supply source of coded data. For example, the selection unit 155 can acquire the coded data supplied from the TS residual encoding unit 153 or the non-TS residual encoding unit 154 (the one designated by the control unit 151). For example, in a case where the transform skip is applied, the selection unit 155 acquires the coded data supplied from the TS residual encoding unit 153. Furthermore, for example, in a case where the transform skip is not applied (in a case where the transform processing is performed), the selection unit 155 acquires the coded data supplied from the non-TS residual encoding unit 154. The selection unit 155 can supply the coded data acquired in this manner to the accumulation buffer 116 (that is, can provide the coded data to the decoding side).

<Transform Skip of Respective Components>

The image encoding device 100 can encode a color image having luminance components and color components. Then, the image encoding device 100 can perform the encoding by skipping (omitting) the transform processing of transforming the residual between the image and the predicted image thereof into coefficient data not only for the luminance components but also for the color components.

For example, the control unit 101 can set the transform skip flag (transform_skip_flag) indicating whether or not to apply the transform skip for each component. The component can be indicated by a component identifier (cIdx). That is, the control unit 101 can set the value of the transform skip flag in association with the value of the component identifier.

That is, the control unit 101 can generate the transform skip flag (transform_skip_flag[xTbY][yTbY][cIdx]) indicating, for each component (cIdx), whether or not to skip the transform processing of transforming the residual between the image to be encoded and the predicted image thereof into coefficient data. Furthermore, the transform mode information encoding unit 150 of the encoding unit 115 can encode the transform skip flag generated by the control unit 101 and generate the coded data of the transform skip flag. Moreover, the accumulation buffer 116 can generate a bit stream including the coded data of the transform skip flag generated by the transform mode information encoding unit 150 and output the bit stream to the outside of the image encoding device 100.

In this manner, for example, the control unit 101 can set the transform skip flag for the color components, and can also apply the transform skip to the color components. Furthermore, the image encoding device 100 can provide the generated transform skip flag (that is, setting of the transform skip for each component) to the decoding side. Therefore, in a case where the transform skip is applied to the color components, the decoding side can correctly decode the bit stream. Therefore, reduction in encoding efficiency can be suppressed as compared with a case where the transform skip can be applied only to the luminance components.

Furthermore, the image encoding device 100 may control the transform processing of the color components on the basis of the setting of the transform skip for each component by the above-described transform skip flag. For example, the orthogonal transform unit 113 may control the transform skip for each component on the basis of the transform skip flag generated by the control unit 101. In this manner, the orthogonal transform unit 113 can apply the transform skip to the transform processing of the color components, for example.

Note that, as described above, by setting the transform skip for each component, the control unit 101 can set the transform skip for each of the color components independently of the luminance components. Therefore, the control unit 101 can set the transform skip for the color components according to whether or not the transform skip for the color components is valid. Thus, the orthogonal transform unit 113 can perform the transform skip on the color components independently of the luminance components. In this manner, reduction in encoding efficiency can be suppressed as compared with a case where setting of the transform skip for the luminance components is applied to the color components.

<Control of Encoding Mode>

Furthermore, the encoding unit 115 may control the encoding mode of the coefficient data corresponding to the component identifiers on the basis of the transform skip flag corresponding to the component identifiers. For example, the control unit 151, the selection unit 152, and the selection unit 155 of the encoding unit 115 may control whether to set the TS residual encoding mode or the non-TS residual encoding mode on the basis of the transform skip flag. For example, the TS residual encoding unit 153 and the non-TS residual encoding unit 154 may encode the coefficient data corresponding to the component identifiers by the encoding mode set as described above, and generate the coded data of the coefficient data.

That is, a plurality of encoding modes having different characteristics is prepared as candidates, and the encoding unit 115 selects and applies an encoding mode from the plurality of prepared candidates on the basis of the transform skip flag corresponding to the component identifiers. That is, the encoding unit 115 encodes the coefficient data in the selected encoding mode. In this manner, the encoding unit 115 can apply the encoding mode having characteristics more suitable for the setting of the transform skip among the encoding modes having different characteristics from each other, and thus it is possible to suppress reduction in encoding efficiency as compared with the case of performing encoding in a single encoding mode.

<Flow of Image Encoding Processing>

Next, a flow of each processing executed by the image encoding device 100 as described above will be described. First, an example of a flow of image encoding processing will be described with reference to a flowchart of FIG. 4.

When the image encoding processing is started, in step S101, the rearrangement buffer 111 is controlled by the control unit 101 to rearrange the order of the frames of the input moving image data from the display order to the encoding order.

In step S102, the control unit 101 sets a processing unit (performs block division) for the input image held by the rearrangement buffer 111.

In step S103, the control unit 101 determines (sets) the encoding parameters for the input image held by the rearrangement buffer 111.

In step S104, the control unit 101 generates the transform mode information (transform_mode) of the transform block corresponding to the component identifier (cIdx).

In step S105, the prediction unit 122 performs the prediction processing and generates a predicted image or the like in an optimum prediction mode. For example, in the prediction processing, the prediction unit 122 performs intra prediction to generate a predicted image or the like in an optimum intra prediction mode, performs inter prediction to generate a predicted image or the like in an optimum inter prediction mode, and selects the optimum prediction mode from the predicted images on the basis of a cost function value or the like.

In step S106, the operation unit 112 calculates a difference between the input image and the predicted image in the optimum mode selected by the prediction processing in step S105. That is, the operation unit 112 generates the predicted residual D between the input image and the predicted image. The predicted residual D obtained in this manner has a smaller data amount than the original image data. Therefore, the amount of data can be compressed as compared with a case where an image is encoded as it is.

In step S107, the orthogonal transform unit 113 performs orthogonal transform processing on the predicted residual D generated by the processing of step S106 according to the transform mode information generated in step S104, and derives the transform coefficient Coeff.

In step S108, the quantization unit 114 quantizes the transform coefficient Coeff obtained by the processing of step S107 by using the quantization parameter calculated by the control unit 101, or the like, and derives the quantized transform coefficient level level.

In step S109, the inverse quantization unit 117 inversely quantizes the quantized transform coefficient level level generated by the processing of step S108 with a characteristic corresponding to the quantization characteristic in step S108 to derive the transform coefficient Coeff_IQ.

In step S110, the inverse orthogonal transform unit 118 inversely orthogonally transforms the transform coefficient Coeff_IQ obtained by the processing of S109 according to the transform mode information generated in step S104 by a method corresponding to the orthogonal transform processing of step S107, and derives the predicted residual D'. Note that since the inverse orthogonal transform processing is similar to the inverse orthogonal transform processing (described later) performed on the decoding side, the description (described later) performed on the decoding side can be applied to the inverse orthogonal transform processing in step S110.

In step S111, the operation unit 119 adds the predicted image obtained by the prediction processing of step S105 to the predicted residual D' derived by the processing of step S110, thereby generating a decoded image that is locally decoded.

In step S112, the in-loop filter unit 120 performs the in-loop filter process on the decoded image that is locally decoded and derived by the processing of step S111.

In step S113, the frame memory 121 stores the decoded image that is locally decoded and derived by the processing of step S111 and the decoded image that is locally decoded and subjected to the filter process in step S112.

In step S114, the encoding unit 115 encodes the quantized transform coefficient level level obtained by the processing of step S108 and the transform mode information generated in step S104. For example, the encoding unit 115 encodes the quantized transform coefficient level level, which is information regarding the image, by arithmetic coding or the like to generate coded data. Furthermore, at this time, the encoding unit 115 encodes various encoding parameters (the header information Hinfo, the prediction mode information Pinfo, and the transform information Tinfo). Moreover, the encoding unit 115 derives the residual information RInfo from the quantized transform coefficient level level, and encodes the residual information RInfo.

In step S115, the accumulation buffer 116 accumulates the coded data obtained in this manner, and outputs the coded data to the outside of the image encoding device 100 as, for example, a bit stream. This bit stream is transmitted to the decoding side via a transmission path or a recording medium, for example.

In step S116, the rate control unit 123 performs rate control as necessary.

When the processing of step S116 ends, the image encoding processing ends.

<Flow of Encoding Processing>

Figure 4:
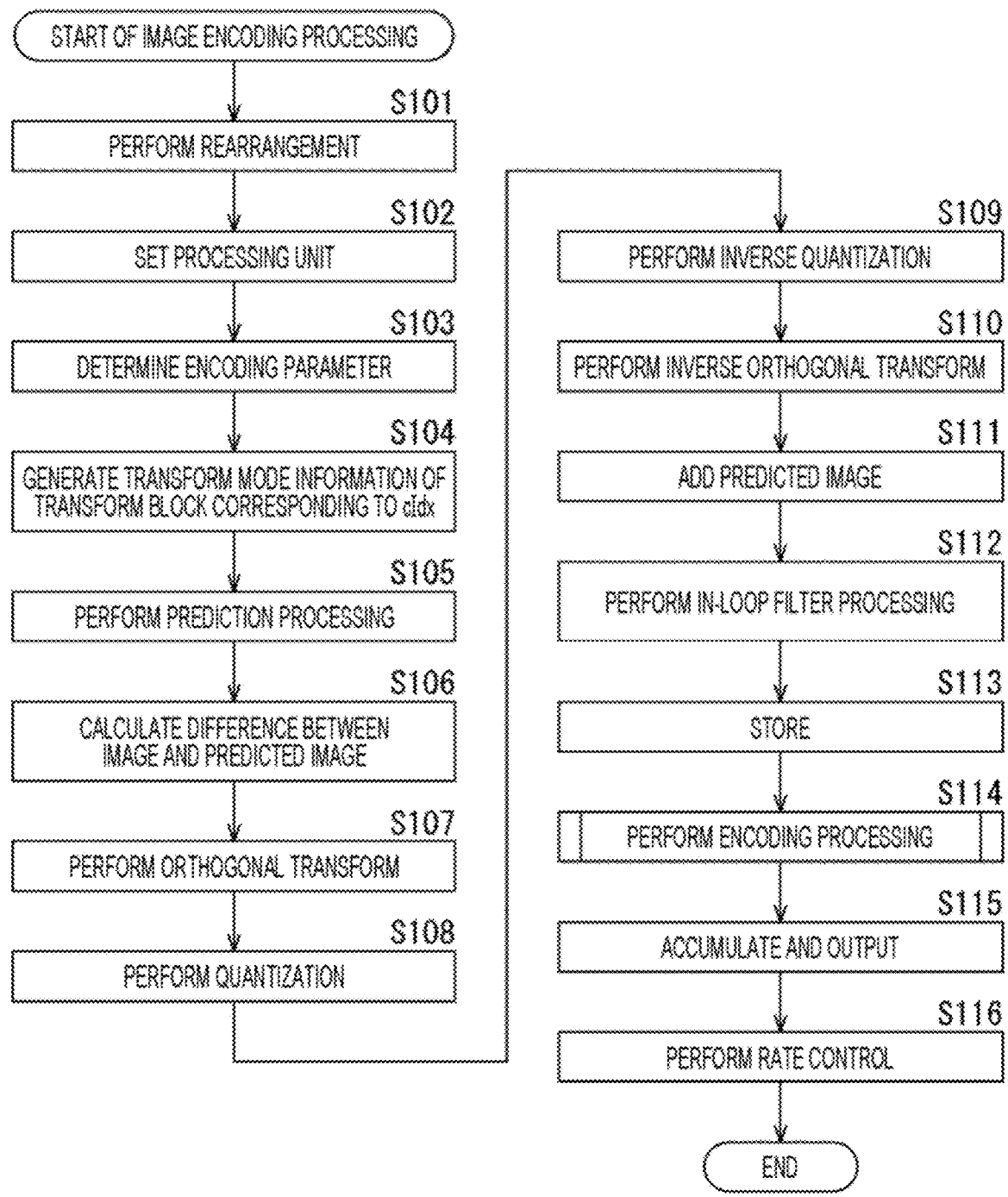
FIG. 4 is a flowchart illustrating an example of a flow of image encoding processing.
Figure 5:
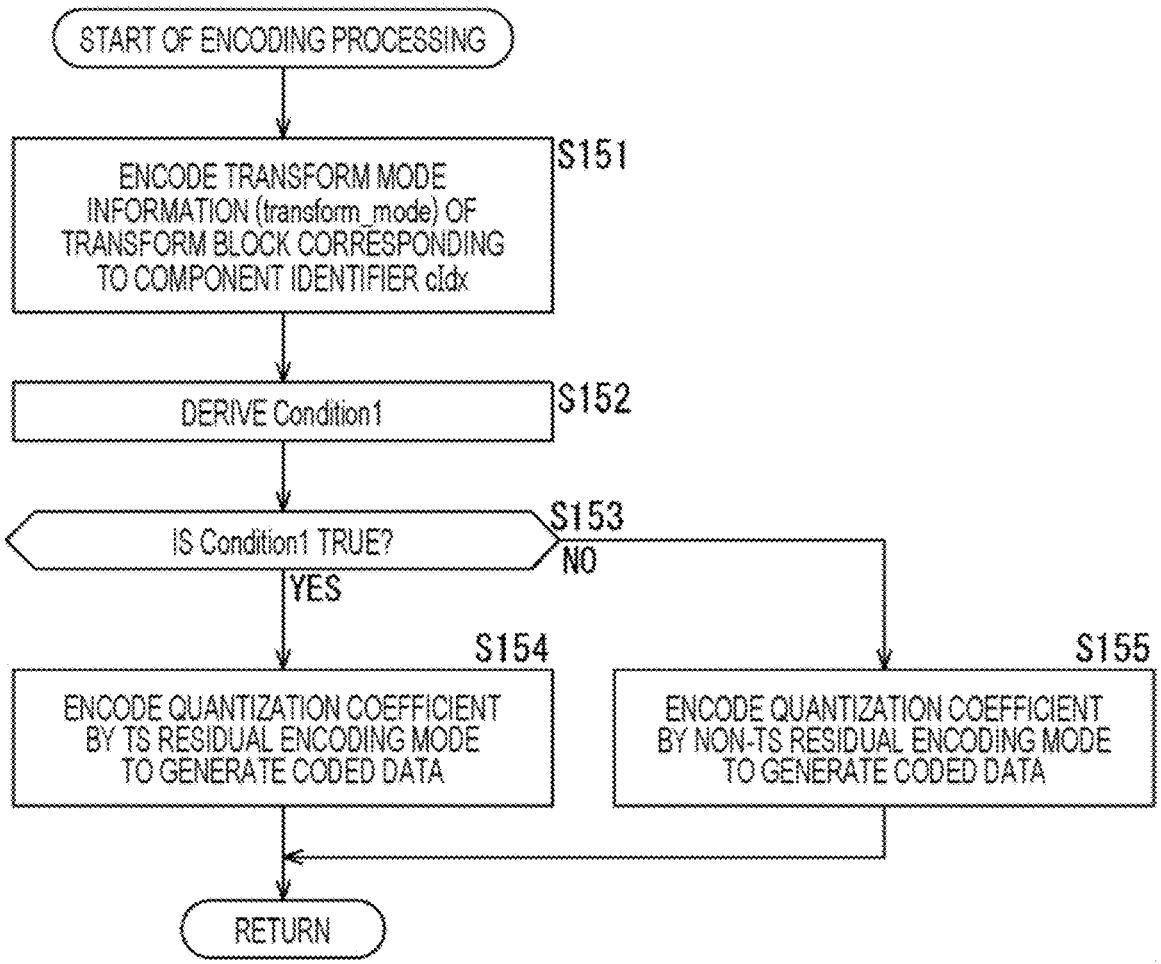
FIG. 5 is a flowchart describing an example of a flow of encoding processing.

Next, an example of a flow of encoding processing executed in step S114 of FIG. 4 will be described with reference to a flowchart of FIG. 5.

When the encoding processing is started, the transform mode information encoding unit 150 of the encoding unit 115 encodes the transform mode information (transform_mode) of the transform block corresponding to the component identifier cIdx in step S151.

In step S152, the control unit 151 derives Condition1 by the following Expression (1). That is, the control unit 151 generates Condition1 by using the transform skip flag (transform_skip_flag[cIdx]) corresponding to the components. Note that, in the transform skip flag (transform_skip_flag[cIdx]), there is a case where the coordinates (xTbY, yTbY) of a processing target block are also written (for example, transform_skip_flag[xTbY][yTbY][cIdx]), but description thereof is omitted here for convenience. Hereinafter, description will be appropriately omitted.

$$\text{Condition1}=(\text{transform\_skip\_flag}[cIdx]==\text{"IS\_SKIP"}) \quad (1)$$

In step S153, the control unit 151 determines whether or not this Condition1 is true. In a case where Condition1 is true, the transform skip flag (transform_skip_flag[cIdx]) corresponding to the component is true (IS_SKIP). Thus, the selection unit 152 and the selection unit 155 are connected to the TS residual encoding unit 153 under control of the control unit 151. Consequently, the process proceeds to step S154.

In step S154, the TS residual encoding unit 153 encodes the quantization coefficient in the TS residual encoding mode to generate coded data. When the coded data is generated, the encoding processing ends.

Furthermore, in step S153, in a case where Condition1 is false, the transform skip flag (transform_skip_flag[cIdx]) corresponding to the component is false. Therefore, the selection unit 152 and the selection unit 155 are connected to the non-TS residual encoding unit 154 under control of the control unit 151. Thus, the processing proceeds to step S155.

In step S155, the non-TS residual encoding unit 154 encodes the quantization coefficient in the non-TS residual encoding mode to generate coded data. When the coded data is generated, the encoding processing ends.

By performing each processing as described above, the image encoding device 100 can apply the TS residual encoding mode also to the color components, and reduction in encoding efficiency can be suppressed.

Note that, in the above description, it has been described that notification of whether or not the transform skip is performed is provided by the transform skip flag (transform_skip_flag) but it is not limited to this, and notification of the mode may be provided as one mode of the identifier mts_idx related to the primary transform. The identifier mts_idx is an identifier indicating transform types in the horizontal direction and the vertical direction of the primary transform. In this case, the control unit 151 can derive Condition1 as in the following Expression (2).

$$\text{Condition1}=(mts\_idx[cIdx]=\text{"IS\_SKIP"}) \quad (2)$$

<3-2. Image Decoding Device>

Figure 6:
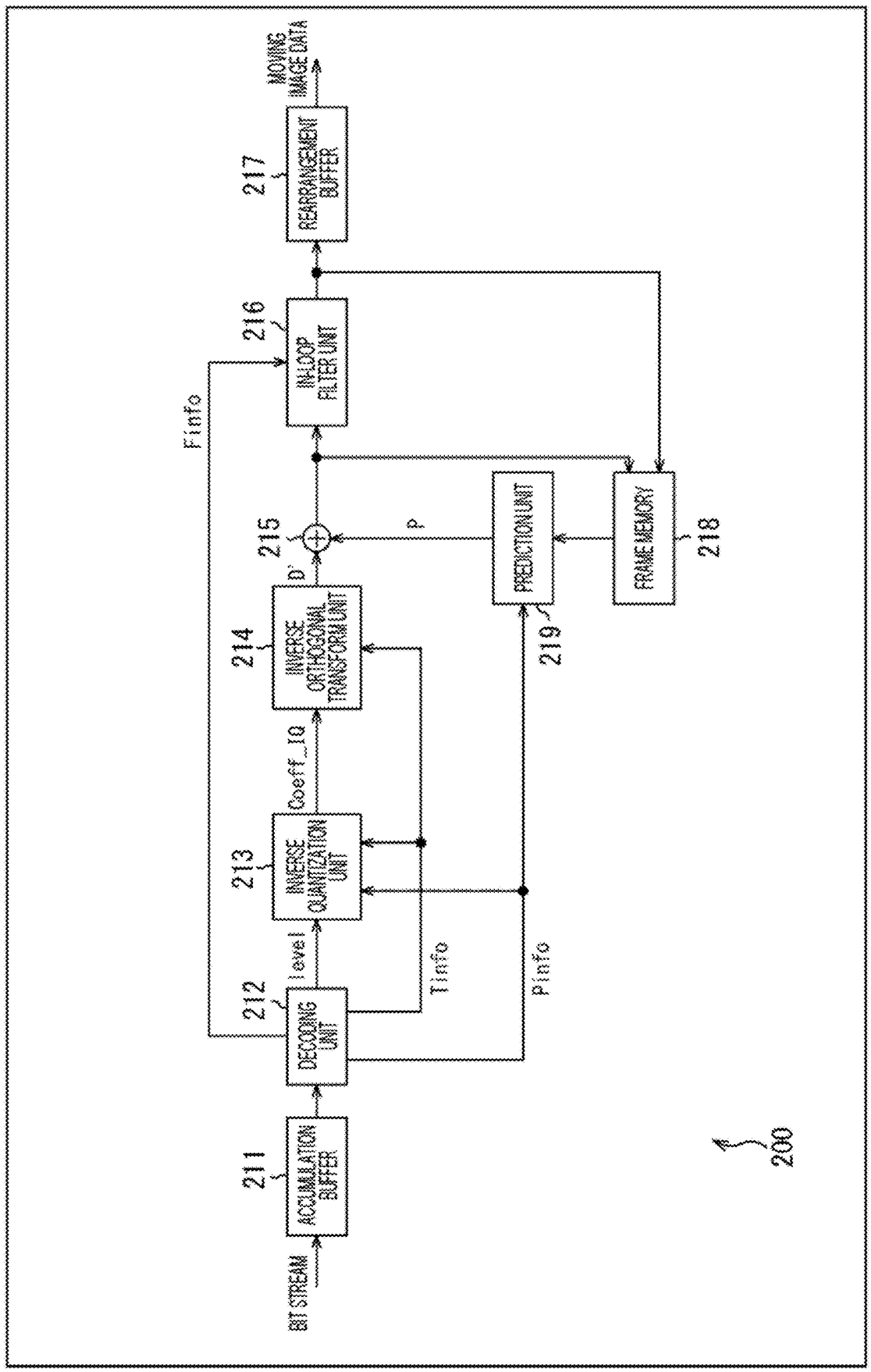
FIG. 6 is a block diagram illustrating a main configuration example of an image decoding device.

FIG. 6 is a block diagram illustrating an example of a configuration of an image decoding device that is one aspect of the image processing device to which the present technology is applied. The image decoding device 200 illustrated in FIG. 6 is a device that decodes coded data in which a predicted residual between an image and a predicted image thereof is encoded, such as AVC or HEVC. For example, the image decoding device 200 implements the technology described in the above-described non-patent documents, and can decode coded data obtained by encoding image data of a moving image by a method conforming to a standard described in any of these non-patent documents. For example, the image decoding device 200 can decode the coded data (bit stream) generated by the above-described image encoding device 100.

Note that while FIG. 6 illustrates main elements such as a processing unit and a flow of data, the elements illustrated in FIG. 6 do not necessarily include all elements. That is, in the image decoding device 200, there may be a processing unit not illustrated as a block in FIG. 6, or there may be processing or a data flow not illustrated as an arrow or the like in FIG. 6. This similarly applies to other drawings describing a processing unit and the like in the image decoding device 200.

In FIG. 6, the image decoding device 200 includes an accumulation buffer 211, a decoding unit 212, an inverse quantization unit 213, an inverse orthogonal transform unit 214, an operation unit 215, an in-loop filter unit 216, a rearrangement buffer 217, a frame memory 218, and a prediction unit 219. Note that the prediction unit 219 includes an intra prediction unit and an inter prediction unit (not illustrated).

<Accumulation Buffer>

The accumulation buffer 211 acquires and holds (stores) the bit stream input to the image decoding device 200. The accumulation buffer 211 extracts coded data included in the accumulated bit stream at a predetermined timing or in a case where a predetermined condition is satisfied, or the like, and supplies the coded data to the decoding unit 212.

<Decoding Unit>

The decoding unit 212 performs processing related to image decoding. For example, the decoding unit 212 uses the coded data supplied from the accumulation buffer 211 as an input, performs entropy decoding (lossless decoding) on a syntax value of each syntax element from the bit string according to the definition of the syntax table to derive parameters.

The syntax element and the parameters derived from the syntax value of the syntax element include, for example, the header information Hinfo, the prediction mode information Pinfo, the transform information Tinfo, the residual information Rinfo, the filter information Finfo, and the like. That is, the decoding unit 212 parses (analyzes and acquires) these pieces of information from the bit stream. These pieces of information will be described below.

<Header Information Hinfo>

The header information Hinfo includes, for example, header information such as video parameter set (VPS)/sequence parameter set (SPS)/picture parameter set (PPS)/picture header (PH)/slice header (SH). The header information Hinfo includes, for example, information defining an image size (horizontal width PicWidth and vertical width PicHeight), a bit depth (luminance bitDepthY and chrominance bitDepthC), a chrominance array type ChromaArrayType, a maximum value MaxCUSize and a minimum value MinCUSize of a CU size, a maximum depth MaxQTDepth and a minimum depth MinQTDepth of quad-tree separation (also referred to as quad-tree division), a maximum depth MaxBTDepth and a minimum depth MinBTDepth of binary-tree division (binary-tree division), a maximum value MaxTSSize of a transform skip block (also referred to as a maximum transform skip block size), an on-off flag (also referred to as a valid flag) of each encoding tool, and the like.

For example, as the on-off flag of the encoding tool included in the header information Hinfo, there is an on-off flag related to the following transform and quantization processing. Note that the on-off flag of the encoding tool can also be interpreted as a flag indicating whether or not syntax related to the encoding tool exists in the coded data. Furthermore, in a case where the value of the on-off flag is one (true), it is indicated that the encoding tool can be used, and in a case where the value of the on-off flag is zero (false), it is indicated that the encoding tool cannot be used. Note that the interpretation of the flag value may be reversed.

An inter-component prediction enabled flag (ccp_enabled_flag): is flag information indicating whether or not inter-component prediction (cross-component prediction (CCP), also referred to as CC prediction) can be used. For example, in a case where the flag information is "1" (true), it is indicated that the flag information can be used, and in a case where the flag information is "0" (false), it is indicated that the flag information cannot be used.

Note that this CCP is also referred to as inter-component linear prediction (CCLM or CCLMP).

<Prediction Mode Information Pinfo>

The prediction mode information Pinfo includes, for example, information such as size information PBSize (predicted block size) of the processing target PB (predicted block), intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPredModeY derived from the syntax, and the like.

Furthermore, the intra prediction mode information IPinfo includes, for example, an inter-component prediction flag (ccp_flag(cclmp_flag)), a multi-class linear prediction mode flag (mclm_flag), a chrominance sample position type identifier (chroma_sample_loc_type_idx), a chrominance MPM identifier (chroma_mpm_idx), a luminance intra prediction mode (IntraPredModeC) derived from these syntaxes, and the like.

The inter-component prediction flag (ccp_flag (cclmp_flag)) is flag information indicating whether or not to apply the inter-component linear prediction. For example, when ccp_flag==1, it is indicated that the inter-component prediction is applied, and when ccp_flag==0, it is indicated that the inter-component prediction is not applied.

The multi-class linear prediction mode flag (mclm_flag) is information (linear prediction mode information) regarding a mode of linear prediction. More specifically, the multi-class linear prediction mode flag (mclm_flag) is flag information indicating whether or not to set the multi-class linear prediction mode. For example, in a case of "0", a one-class mode (single-class mode) (for example, CCLMP) is indicated, and in a case of "1", a two-class mode (multi-class mode) (for example, MCLMP) is indicated.

The chrominance sample position type identifier (chroma_sample_loc_type_idx) is an identifier that identifies a type (also referred to as a chrominance sample position type) of a pixel position of the chrominance component.

Note that this chrominance sample position type identifier (chroma_sample_loc_type_idx) is transmitted as (stored in) information regarding the pixel position of the chrominance component (chroma_sample_loc_info( )).

The chrominance MPM identifier (chroma_mpm_idx) is an identifier indicating which prediction mode candidate in the chrominance intra prediction mode candidate list (intraPredModeCandListC) is designated as the chrominance intra prediction mode.

The motion prediction information MVinfo includes, for example, information such as merge_idx, merge_flag, inter_pred_idc, ref_idx_LX,_mvp_1X_flag, X={0, 1}, and mvd (see, for example, JCTVC-W1005, 7.3.8.6 Prediction Unit Syntax).

Of course, the information included in the prediction mode information Pinfo is arbitrary, and information other than these pieces of information may be included.

<Transform Information Tinfo>

The transform information Tinfo includes, for example, the following information. Of course, the information included in the transform information Tinfo is arbitrary, and information other than these pieces of information may be included.

The horizontal width size TBWSize and the vertical width TBHSize (or a logarithmic value log 2TBWSize, log 2TBHSize of each TBWSize with a base of 2, TBHSize) of the processing target transform block. The transform skip flag (ts_flag): is a flag indicating whether or not to skip (inverse) primary transform and (inverse) secondary transform.

Scan Identifier (scanIdx)

Quantization parameter (qp)

Quantization matrix (scaling_matrix (for example, JCTVC-W1005, 7.3.4 Scaling list data syntax))

<Residual Information Rinfo>

The residual information Rinfo (see, for example, 7.3.8.11 Residual Coding syntax of JCTVC-W1005) includes, for example, the following syntax.

cbf (coded_block_flag): residual data presence-absence flag last_sig_coeff_x_pos: last non-zero coefficient X coordinate last_sig_coeff_y_pos: last non-zero coefficient Y-coordinate coded_sub_block_flag: sub-block non-zero coefficient presence-absence flag sig_coeff_flag: non-zero coefficient presence-absence flag gr1_flag: a flag indicating whether the level of the non-zero coefficient is greater than one (also referred to as a GR1 flag)

gr2_flag: a flag indicating whether the level of the non-zero coefficient is greater than two (also referred to as a GR2 flag)

sign_flag: a sign indicating positive or negative of a non-zero coefficient (also referred to as a sign code)

coeff_abs_level_remaining: residual level of non-zero coefficient (also referred to as non-zero coefficient residual level)

or the like.

Of course, the information included in the residual information Rinfo is arbitrary, and information other than these pieces of information may be included.

<Filter Information Finfo>

The filter information Finfo includes, for example, control information related to each filter process described below.

Control information regarding the deblocking filter (DBF)

Control information regarding pixel adaptive offset (SAO)

Control Information regarding adaptive loop filter (ALF)

Control information on other linear and nonlinear filters

More specifically, for example, information for specifying a picture to which each filter is applied and a region in the picture, filter on-off control information in units of CUs, filter on-off control information regarding boundaries of slices and tiles, and the like are included. Of course, the information included in the filter information Finfo is arbitrary, and information other than these pieces of information may be included.

Returning to the description of the decoding unit 212, the decoding unit 212 derives the quantized transform coefficient level level at each coefficient position in each transform block with reference to the residual information Rinfo. The decoding unit 212 supplies the quantized transform coefficient level to the inverse quantization unit 213.

Furthermore, the decoding unit 212 supplies the parsed header information Hinfo, the prediction mode information Pinfo, the transform information Tinfo, and the filter information Finfo to each block. Specifically, it is as follows.

The header information Hinfo is supplied to the inverse quantization unit 213, the inverse orthogonal transform unit 214, the prediction unit 219, and the in-loop filter unit 216. The prediction mode information Pinfo is supplied to the inverse quantization unit 213 and the prediction unit 219. The transform information Tinfo is supplied to the inverse quantization unit 213 and the inverse orthogonal transform unit 214. The filter information Finfo is supplied to the in-loop filter unit 216.

Of course, the above example is one example, and the present technology is not limited to this example. For example, each encoding parameter may be supplied to an arbitrary processing unit. Furthermore, other information may be supplied to an arbitrary processing unit.

<Inverse Quantization Unit>

The inverse quantization unit 213 performs processing related to inverse quantization. For example, the inverse quantization unit 213 uses the transform information Tinfo and the quantized transform coefficient level level supplied from the decoding unit 212 as inputs, scales (inversely quantizes) the value of the quantized transform coefficient level on the basis of the transform information Tinfo, and derives the transform coefficient Coeff_IQ after inverse quantization.

Note that this inverse quantization is performed as inverse processing of quantization by the quantization unit 114. Furthermore, this inverse quantization is processing similar to the inverse quantization by the inverse quantization unit 117. That is, the inverse quantization unit 117 performs processing (inverse quantization) similar to that of the inverse quantization unit 213.

The inverse quantization unit 213 supplies the derived transform coefficient Coeff_IQ to the inverse orthogonal transform unit 214.

<Inverse Orthogonal Transform Unit>

The inverse orthogonal transform unit 214 performs processing related to inverse orthogonal transform. For example, the inverse orthogonal transform unit 214 uses the transform coefficient Coeff_IQ supplied from the inverse quantization unit 213 and the transform information Tinfo supplied from the decoding unit 212 as inputs, and performs inverse orthogonal transform processing (inverse transform processing) on the transform coefficient on the basis of the transform information Tinfo to derive the predicted residual D'.

Note that this inverse orthogonal transform is performed as inverse processing of the orthogonal transform by the orthogonal transform unit 113. Furthermore, this inverse orthogonal transform is processing similar to the inverse orthogonal transform by the inverse orthogonal transform unit 118. That is, the inverse orthogonal transform unit 118 performs processing (inverse orthogonal transform) similar to that of the inverse orthogonal transform unit 214.

The inverse orthogonal transform unit 214 supplies the derived predicted residual D' to the operation unit 215.

<Operation Unit>

The operation unit 215 performs processing related to addition of information regarding an image. For example, the operation unit 215 uses the predicted residual supplied from the inverse orthogonal transform unit 214 and the predicted image supplied from the prediction unit 219 as inputs. The operation unit 215 adds the predicted residual and the predicted image (prediction signal) corresponding to the predicted residual to derive the locally decoded image.

The operation unit 215 supplies the derived locally decoded image to the in-loop filter unit 216 and the frame memory 218.

<In-Loop Filter Unit>

The in-loop filter unit 216 performs a process related to the in-loop filter process. For example, the in-loop filter unit 216 uses the locally decoded image supplied from the operation unit 215 and the filter information Finfo supplied from the decoding unit 212 as inputs. Note that the information input to the in-loop filter unit 216 is arbitrary, and information other than these pieces of information may be input.

The in-loop filter unit 216 appropriately performs a filter process on the locally decoded image on the basis of the filter information Finfo.

For example, the in-loop filter unit 216 applies four in-loop filters of a bilateral filter, a deblocking filter (DBF), an adaptive offset filter (sample adaptive offset (SAO)), and an adaptive loop filter (ALF) in this order. Note that which filter is applied and in which order the filter is applied are arbitrary and can be selected as appropriate.

The in-loop filter unit 216 performs a filter process corresponding to the filter process performed by the encoding side (for example, the in-loop filter unit 120 of the image encoding device 100). Of course, the filter process performed by the in-loop filter unit 216 is arbitrary and is not limited to the above example. For example, the in-loop filter unit 216 may apply a Wiener filter or the like.

The in-loop filter unit 216 supplies the locally decoded image subjected to the filter process to the rearrangement buffer 217 and the frame memory 218.

<Rearrangement Buffer>

The rearrangement buffer 217 receives the locally decoded image supplied from the in-loop filter unit 216 as an input, and holds (stores) the locally decoded image. The rearrangement buffer 217 reconstructs the decoded image in each picture unit using the locally decoded image, and holds (stores in the buffer) the decoded image. The rearrangement buffer 217 rearranges the obtained decoded images from the decoding order to the reproduction order. The rearrangement buffer 217 outputs a group of rearranged decoded images to the outside of the image decoding device 200 as moving image data.

<Frame Memory>

The frame memory 218 performs processing related to storage of data related to an image. For example, the frame memory 218 uses the locally decoded image supplied from the operation unit 215 as an input, reconstructs the decoded image in each picture unit, and stores the decoded image in the buffer in the frame memory 218.

Furthermore, the frame memory 218 uses the locally decoded image subjected to the in-loop filter process supplied from the in-loop filter unit 216 as an input, reconstructs the decoded image in each picture unit, and stores the decoded image in the buffer in the frame memory 218. The frame memory 218 appropriately supplies the stored decoded image (or a part thereof) to the prediction unit 219 as a reference image.

Note that the frame memory 218 may store the header information Hinfo, the prediction mode information Pinfo, the transform information Tinfo, the filter information Finfo, and the like related to generation of the decoded image.

<Encoding Unit>

Figure 7:
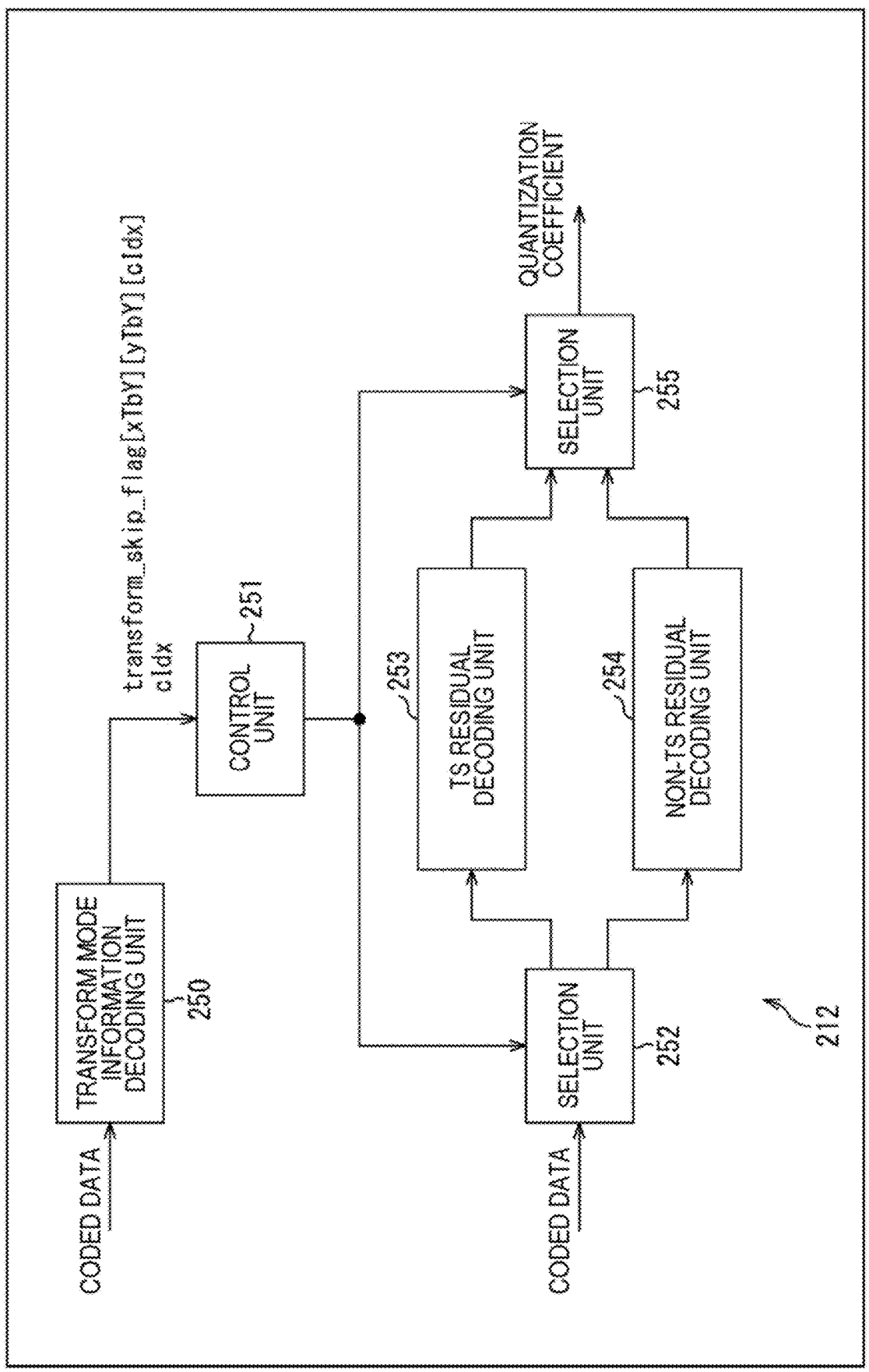
FIG. 7 is a block diagram illustrating a main configuration example of a decoding unit.

FIG. 7 is a block diagram illustrating a main configuration example of the decoding unit 212 in FIG. 6. As illustrated in FIG. 7, the decoding unit 212 includes a transform mode information decoding unit 250, a control unit 251, a selection unit 252, a TS residual decoding unit 253, a non-TS residual decoding unit 254, and a selection unit 255.

The transform mode information decoding unit 250 performs processing related to decoding of the coded data of the transform mode information (transform_mode). This transform mode information is information regarding the mode of the inverse transform processing by the inverse orthogonal transform unit 214. For example, the transform mode information may include a transform skip flag (transform_skip_flag[xTbY][yTbY][cIdx]), an identifier related to primary transform (mts_idx[xTbY][yTbY][cIdx]), and the like.

For example, the transform mode information decoding unit 250 can acquire the coded data supplied from the accumulation buffer 211. Furthermore, the transform mode information decoding unit 250 can decode the acquired coded data and generate transform mode information and a component identifier (cIdx). Moreover, the transform mode information encoding unit 150 can supply the generated transform mode information and the like to the control unit 251.

The control unit 251 performs processing related to control of the decoding mode. For example, the control unit 251 can acquire the transform mode information ((transform_skip_flag[xTbY][yTbY][cIdx]), mts_idx[xTbY][yTbY][cIdx], and the like) and the component identifier (cIdx) supplied from the transform mode information decoding unit 250. Furthermore, the control unit 251 can switch between the TS residual decoding mode and the non-TS residual decoding mode as the decoding mode of the coded data of the coefficient data by controlling selection of the selection unit 252 or the selection unit 255 on the basis of the transform skip flag corresponding to the component identifier. For example, in a case where the transform skip is applied, the control unit 251 connects the selection unit 252 and the selection unit 255 to the TS residual decoding unit 253. Furthermore, for example, in a case where the transform skip is not applied (in a case where the transform processing is performed), the control unit 251 connects the selection unit 252 and the selection unit 255 to the non-TS residual decoding unit 254.

The selection unit 252 performs processing related to selection of a supply destination of the coded data of the coefficient data (quantization coefficient). For example, the selection unit 252 can acquire the coded data supplied from the accumulation buffer 211. Furthermore, under control of the control unit 251, the selection unit 252 can supply the acquired coded data to the TS residual decoding unit 253 or the non-TS residual decoding unit 254 (the one designated by the control unit 251). For example, in a case where the transform skip is applied, the selection unit 252 supplies the coded data to the TS residual decoding unit 253. Furthermore, for example, in a case where the transform skip is not applied (in a case where the transform processing is performed), the selection unit 252 supplies the coded data to the non-TS residual decoding unit 254.

The TS residual decoding unit 253 performs processing related to the TS residual decoding mode. For example, the TS residual decoding unit 253 can acquire the coded data supplied from the selection unit 252. Furthermore, the TS residual decoding unit 253 can decode the acquired coded data in the TS residual decoding mode. The TS residual decoding mode is a decoding mode for a case of skipping the transform processing. For example, decoding in the TS residual decoding mode corresponds to encoding in the TS residual encoding mode, and is optimized for the coded data of the coefficient data from which the transform processing is skipped. A more specific method of the TS residual decoding mode is described in Non-Patent Document 4 and the like. The TS residual decoding unit 253 can decode the coded data in this manner and generate a quantization coefficient. The TS residual decoding unit 253 can supply the quantization coefficient generated in this manner to the selection unit 255.

The non-TS residual decoding unit 254 performs processing related to the non-TS residual decoding mode. For example, the non-TS residual decoding unit 254 can acquire the coded data supplied from the selection unit 252. Furthermore, the non-TS residual decoding unit 254 can decode the acquired coded data in the non-TS residual decoding mode. The non-TS residual decoding mode is a decoding mode for a case of performing the transform processing. For example, the decoding in the non-TS residual decoding mode corresponds to the encoding in the non-TS residual encoding mode, and is optimized for the coded data of the coefficient data on which the transform processing has been performed. A more specific method of the non-TS residual decoding mode is described in Non-Patent Document 4 and the like. The non-TS residual decoding unit 254 can decode the coded data in this manner and generate the quantization coefficient. The non-TS residual decoding unit 254 can supply the quantization coefficient generated in this manner to the selection unit 255.

The selection unit 255 performs processing related to selection of a supply source of the quantization coefficient. For example, the selection unit 255 can acquire the quantization coefficient supplied from the TS residual decoding unit 253 or the non-TS residual decoding unit 254 (the one designated by the control unit 251). For example, in a case where the transform skip is applied, the selection unit 255 acquires the quantization coefficient supplied from the TS residual decoding unit 253. Furthermore, for example, in a case where the transform skip is not applied (in a case where the transform processing is performed), the selection unit 255 acquires the coded data supplied from the non-TS residual decoding unit 254. The selection unit 255 can supply the acquired quantization coefficient to the inverse quantization unit 213.

<Transform Skip of Respective Components>

The image decoding device 200 can decode coded data of a color image having luminance components and color components. Then, the image decoding device 200 can skip (omit) the inverse transform processing of transforming coefficient data generated by decoding the coded data into the residual between the image and the predicted image thereof for not only the luminance components but also the color components.

For example, the transform mode information decoding unit 250 can decode the coded data of the transform skip flag corresponding to the component identifier to obtain the transform skip flag corresponding to the component identifier.

In this manner, when decoding, the setting of the transform skip for each component indicated by the transform skip flag can be applied. Therefore, the bit stream of the color components to which the transform skip is applied can be correctly decoded. Therefore, reduction in encoding efficiency can be suppressed as compared with a case where the transform skip can be applied only to the luminance components.

Furthermore, when decoding the coded data of the image, the inverse transform processing of the color components may be controlled on the basis of the setting of the transform skip for each component by the above-described transform skip flag. That is, the transform skip may be applied to the inverse transform processing of the color components. In this manner, the bit stream of the color components to which the transform skip is applied can be correctly decoded. Therefore, reduction in encoding efficiency can be suppressed as compared with a case where the transform skip can be applied only to the luminance components.

Note that, as described above, by setting the transform skip for each component, it is possible to set the transform skip for the color components independently of the luminance components. Therefore, it is possible to set the transform skip for the color components according to whether or not the transform skip is valid for the color components. In this manner, reduction in encoding efficiency can be suppressed as compared with a case where setting of the transform skip for the luminance components is applied to the color components.

<Control of Encoding Mode>

Furthermore, in a case where the transform skip is applied to the color components as in the above-described method 1, such control of the decoding mode may also be applied. For example, the TS residual decoding mode may be applied as the decoding mode in a case where the transform skip is applied to each value of the identifier of the component, and the non-TS residual decoding mode may be applied as the decoding mode in a case where the transform skip is not applied.

For example, on the basis of the transform skip flag corresponding to the component identifier, it may be controlled whether the decoding mode of the coded data of the coefficient data corresponding to the component identifier is set to the TS residual decoding mode that is a mode for a case of skipping the inverse transform processing of transforming the coefficient data into the residual between the image and the predicted image, or to the non-TS residual decoding mode that is a mode for a case of not skipping the inverse transform processing, and the coded data of the coefficient data corresponding to the component identifier may be decoded by the decoding mode set as described above to generate the coefficient data corresponding to the component identifier.

In this manner, since the decoding mode according to the setting of the transform skip can be applied, reduction in encoding efficiency can be suppressed as compared with a case where decoding is performed in a single decoding mode.

<Flow of Image Decoding Processing>

Next, a flow of each processing executed by the image decoding device 200 having the configuration as described above will be described. First, an example of a flow of image decoding processing will be described with reference to a flowchart of FIG. 8.

When the image decoding processing is started, in step S401, the accumulation buffer 211 acquires and holds (accumulates) a bit stream supplied from the outside of the image decoding device 200.

In step S202, the decoding unit 212 extracts and decodes coded data from the bit stream to obtain the quantized transform coefficient level level. Furthermore, the decoding unit 212 parses (analyzes and acquires) various encoding parameters from the bit stream by this decoding.

In step S203, the inverse quantization unit 213 performs inverse quantization, which is inverse processing of the quantization performed on the encoding side, on the quantized transform coefficient level level obtained by the processing of step S202 to obtain the transform coefficient Coeff_IQ.

In step S204, under control of step S203, the inverse orthogonal transform unit 214 performs inverse orthogonal transform processing, which is inverse processing of the orthogonal transform processing performed on the encoding side, on the transform coefficient Coeff_IQ obtained in step S203 to obtain the predicted residual D'.

In step S205, the prediction unit 219 executes prediction processing by a prediction method designated by the encoding side on the basis of the information parsed in step S202, and generates the predicted image P by referring to the reference image stored in the frame memory 218, or the like.

In step S206, the operation unit 215 adds the predicted residual D' obtained in step S204 and the predicted image P obtained in step S205 to derive a locally decoded image $R_{local}$.

In step S207, the in-loop filter unit 216 performs the in-loop filter process on the locally decoded image $R_{local}$ obtained by the processing of step S206.

In step S208, the rearrangement buffer 217 derives a decoded image R using the locally decoded image $R_{local}$ subjected to the filter process obtained by the processing of step S207, and rearranges the order of a group of decoded images R from the decoding order to the reproduction order. The group of the decoded images R rearranged in the reproduction order is output as a moving image to the outside of the image decoding device 200.

Furthermore, in step S209, the frame memory 218 stores at least one of the locally decoded image Rio-Ai obtained by the processing of step S206 or the locally decoded image $R_{local}$ after the filter process obtained by the processing of step S207.

When the processing of step S209 ends, the image decoding processing ends.

<Flow of Decoding Processing>

Figure 8:
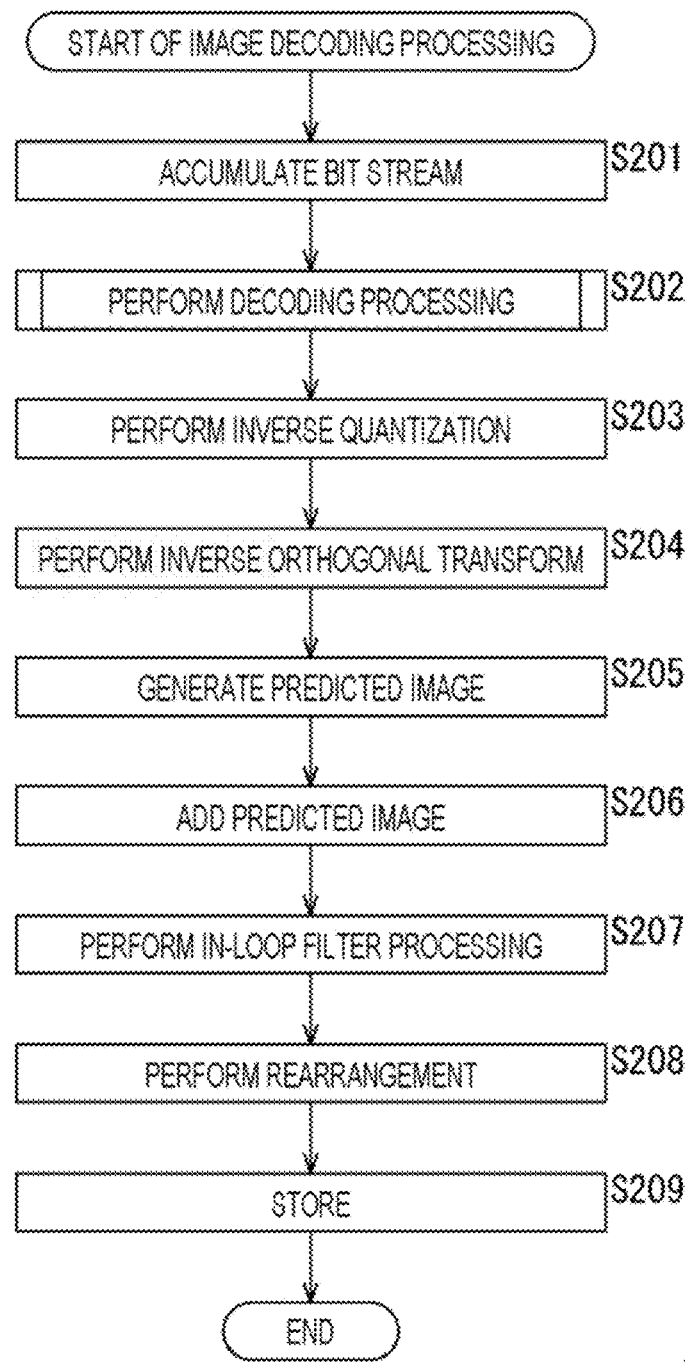
FIG. 8 is a flowchart illustrating an example of a flow of image decoding processing.
Figure 9:
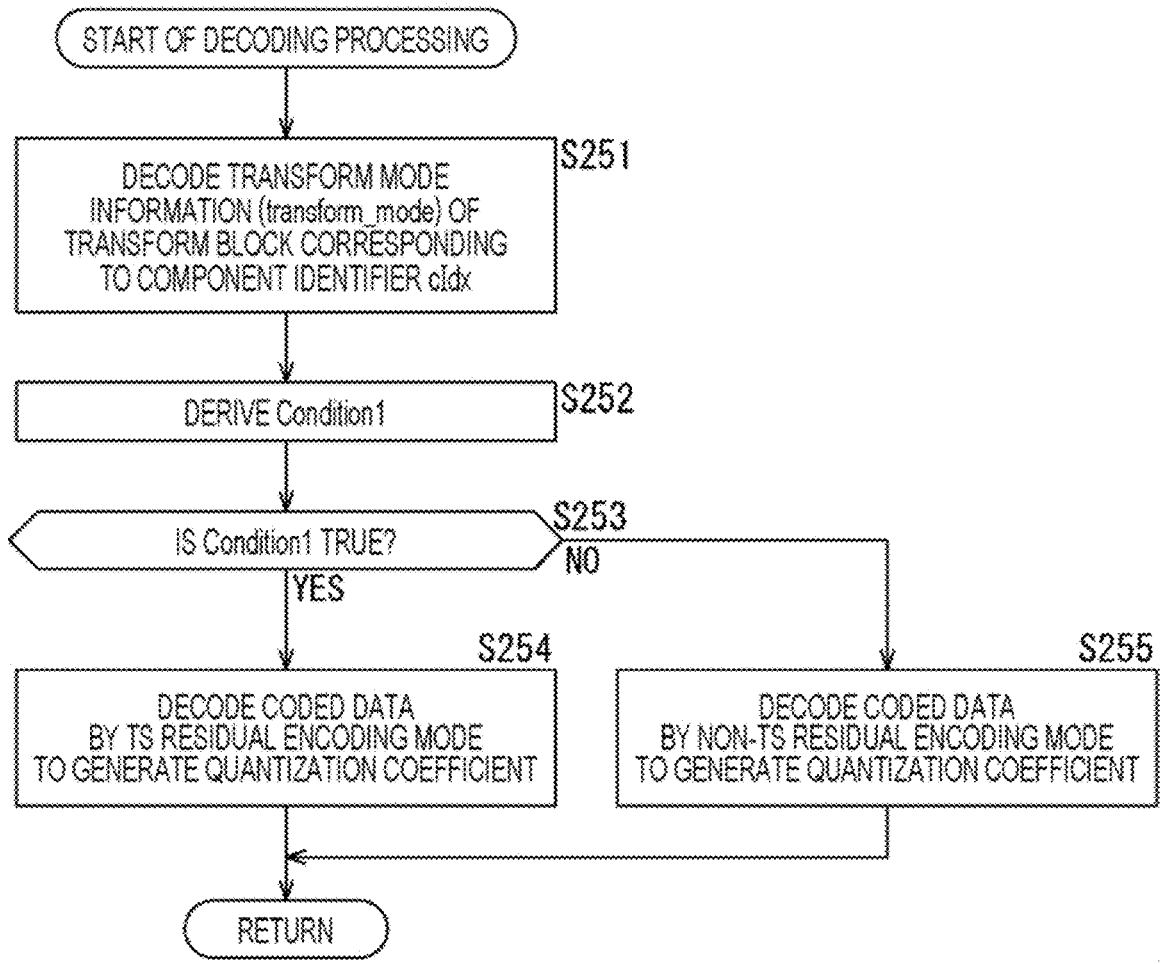
FIG. 9 is a flowchart illustrating an example of a flow of decoding processing.

Next, an example of a flow of decoding processing executed in step S202 of FIG. 8 will be described with reference to a flowchart of FIG. 9.

When the decoding processing is started, in step S251, the transform mode information decoding unit 250 of the decoding unit 212 decodes the transform mode information (transform_mode) of the transform block corresponding to the component identifier cIdx.

In step S252, the control unit 251 derives Condition1 by the above-described Expression (1). That is, the control unit 251 generates Condition1 by using the transform skip flag (transform_skip_flag[cIdx]) corresponding to the component.

In step S253, the control unit 251 determines whether or not this Condition1 is true. In a case where Condition1 is true, the transform skip flag (transform_skip_flag[cIdx]) corresponding to the component is true (IS_SKIP). Therefore, the selection unit 252 and the selection unit 255 are connected to the TS residual decoding unit 253 under control of the control unit 251. Thus, the processing proceeds to step S254.

In step S254, the TS residual decoding unit 253 decodes the coded data in the TS residual decoding mode to generate a quantization coefficient. When the quantization coefficient is generated, the decoding processing ends.

Furthermore, in step S253, in a case where Condition1 is false, the transform skip flag (transform_skip_flag [cIdx]) corresponding to the component is false. Thus, the selection unit 252 and the selection unit 255 are connected to the non-TS residual decoding unit 254 under control of the control unit 251. Consequently, the processing proceeds to step S255.

In step S255, the non-TS residual decoding unit 254 encodes the coded data in the non-TS residual decoding mode to generate a quantization coefficient. When the quantization coefficient is generated, the decoding processing ends.

By performing each processing as described above, the image decoding device 200 can apply the TS residual decoding mode also to the color components, and can suppress reduction in encoding efficiency.

Note that, in the above description, it has been described that notification of whether or not the transform skip is performed is provided by the transform skip flag (transform_skip_flag) but it is not limited to this, and notification of the mode may be provided as one mode of the identifier mts_idx related to the primary transform. The identifier mts_idx is an identifier indicating transform types in the horizontal direction and the vertical direction of the primary transform. In this case, the control unit 251 can derive Condition1 as in the above-described Expression (2).

<3-3. Syntax Semantics>

FIG. 10 illustrates an example of syntax of a tranmform-unit (TU) in this case. In a case of the example of FIG. 10, the transform mode information (transform_mode ( . . . , 0), transform_mode ( . . . , 0), transform_mode ( . . . , 2),) corresponding to respective components is derived, and whether or not to apply the transform skip (residual_comding ( . . . , cIdx) or residual_ts_coding ( . . . , cIdx)) is determined for each component (tu_cbf_luma, tu_cbf_cb, tu_cbf_cr).

An example of syntax of the transform mode information is illustrated in FIG. 11. In a case of the example in FIG. 11, the transform skip flag (transform_skip_flag[x0][y0][cIdx]) for each component and an identifier (mts_idx[x0][y0][cIdx]) of a transform type of primary transform for each component are set as the transform mode information (transform_mode ( . . . , cIdx)) for each component. In this case, conditions of the respective components for generating these pieces of information are the same. The contents of the conditions are arbitrary. For example, an enable flag of the transform skip (sps_transform_skip_enabled_flag) or the like set in a sequence parameter set (SPS) is used for the conditions.

An example of syntax of the transform skip (residual_ts_coding ( . . . , cIdx)) is illustrated in FIG. 12. As illustrated in FIG. 12, the setting of the transform skip is performed for each component (cIdx). Furthermore, A in FIG. 13 illustrates an example of semantics of the transform skip flag (transform_skip_flag[x0][y0][cIdx]) of the transform mode information. Moreover, B in FIG. 13 illustrates an example of semantics of the identifier (mts_idx[x0][y0][cIdx]) of the transform type of the primary transform. In this manner, the information regarding the transform skip is set for each component. Therefore, as described above, the transform skip can be applied to the color components, and reduction in encoding efficiency can be suppressed.

Note that in the syntax of the transform mode information, the conditions of the respective components for generating the transform skip flag (transform_skip_flag[x0][y0][cIdx]) for each component and the identifier (mts_idx[x0][y0][cIdx]) of the transform type of the primary transform for each component may be different from each other as in the example in FIG. 14. By preparing the condition for each component in this manner, redundancy of the determination condition can be suppressed, and an increase in processing load can be suppressed.

<3-4. Transform Skip Residual Encoding Use Flag>

Note that a transform skip residual encoding use flag indicating selection between the TS residual encoding mode (TS residual decoding mode) and the non-TS residual encoding mode (non-TS residual decoding mode) may be applied.

An example of syntax of the sequence parameter set (SPS) is illustrated in FIG. 15. For example, the control unit 101 may set the transform skip residual encoding use flag sps_ts_residual_coding_use_flag in this sequence parameter set.

The sps_ts_residual_coding_use_flag is the transform skip residual encoding use flag notification of which is provided at the sequence parameter set level. In a case where the value of this flag is "1", it is indicated that the TS residual encoding mode is applied at the time of transform skip. Furthermore, in a case where the value of this flag is "0", it is indicated that the non-TS residual encoding mode is applied at the time of transform skip.

FIG. 16 illustrates an example of syntax of a TU in this case. In the case of the example of FIG. 16, this transform skip residual encoding use flag is used as a condition for determining whether or not to apply transform skip. FIG. 17 illustrates semantics of sps_ts_residual_coding_use_flag. Furthermore, Condition1 in this case is derived using, for example, the following Expression (3).

Condition1=(transform_skip_flag[cId$x$]==
 "IS_SKIP"& & $sps\_ts$_residual_coding_use_f-
 lag==1)  (3)

Note that in a case where the identifier of the transform type of the primary transform is used, the transform type is derived as in the following (4).

Condition1=($mts\_idx$[cIdx]="IS_SKIP"& &
 $sps\_ts$_residual_coding_use_flag==1)  (4)

By using such a high-level flag, even an encoder or a decoder that does not support transform skipping can correctly perform encoding and decoding on the basis of this flag. Therefore, reduction in encoding efficiency can be suppressed. In other words, implementation of the TS residual encoding mode (TS residual decoding mode) in the encoder and the decoder can be omitted, and increase in the circuit scale can be suppressed.

Note that a data unit for setting the transform skip residual encoding use flag is arbitrary, and may be other than the sequence parameter set. For example, notification of the transform skip residual encoding use flag may be provided at a CU level, a slice level, a picture level, or the like. As granularity of the data unit is made finer, the degree of freedom of mode switching increases, and the room for improving encoding efficiency is improved.

<3-5. Transform Skip Residual Encoding Use Specifying Mode Flag>

Furthermore, a flag indicating whether to apply the TS residual encoding mode (TS residual decoding mode) or to apply the non-TS residual encoding mode (non-TS residual decoding mode) in a specific mode may be applied.

An example of syntax of the sequence parameter set (SPS) is illustrated in FIG. 18. For example, the control unit 101 may set the transform skip residual encoding use specifying mode flag sps_ts_residual_coding_use_for_bdpcm_flag in this sequence parameter set.

This sps_ts_residual_coding_use_for_bdpcm_flag is a flag notification of which is provided at the sequence parameter set level, and is flag information indicating that selection of the encoding mode is enabled in block_based differential pulse code modulation (BDPCM). In a case where the value of this flag is "1", it is indicated that the TS residual encoding mode is applied in a case of the BDPCM. Furthermore, in a case where the value of this flag is "0", it is indicated that the non-TS residual encoding mode is applied in the case of the BDPCM.

FIG. 19 illustrates an example of syntax of the TU in this case. In the case of the example of FIG. 19, this transform skip residual encoding use specifying mode flag is used as a condition for determining whether or not to apply the transform skip. FIG. 20 illustrates semantics of sps_ts_residual_coding_use_for_bdpcm_flag. Furthermore, Condition1 in this case is derived using, for example, the following Expression (5).

Condition1(transform_skip_flag[cIdx]==
 "IS_SKIP"&&!(int $ra\_bdpcm$_
 flag && $sps\_ts$_residual_coding_
 use_for_bdpcm_flag==0))  (5)

Note that, in a case where the identifier of the transform type of the primary transform is used, the transform type is derived as in the following (6).

Condition1=($mts\_idx$[cIdx]=="IS_SKIP"&&!(int
 $ra\_bdpcm$_flag & & $sps\_ts$_residual_codin-
 g_use_for_bdpcm_flag==0))  (6)

By using such a high-level flag, the TS residual encoding mode and the non-TS residual encoding mode can be switched in the BDPCM.

Note that the data unit for setting the transform skip residual encoding use specifying mode flag is arbitrary, and may be other than the sequence parameter set. For example, notification of the transform skip residual encoding use specifying mode flag may be provided at the CU level, the slice level, the picture level, or the like. As granularity of the data unit is made finer, the degree of freedom of mode switching increases, and the room for improving encoding efficiency is improved.

4. SECOND EMBODIMENT

<4-1. Correction of Quantization Parameter in Quantization>

In each value of the component identifier, the quantization parameter may be corrected in a case of the transform skip. That is, in a case where the transform skip is applied, the quantization parameter may be corrected. Then, such control may be performed for each component.

<Quantization Unit>

Figure 21:
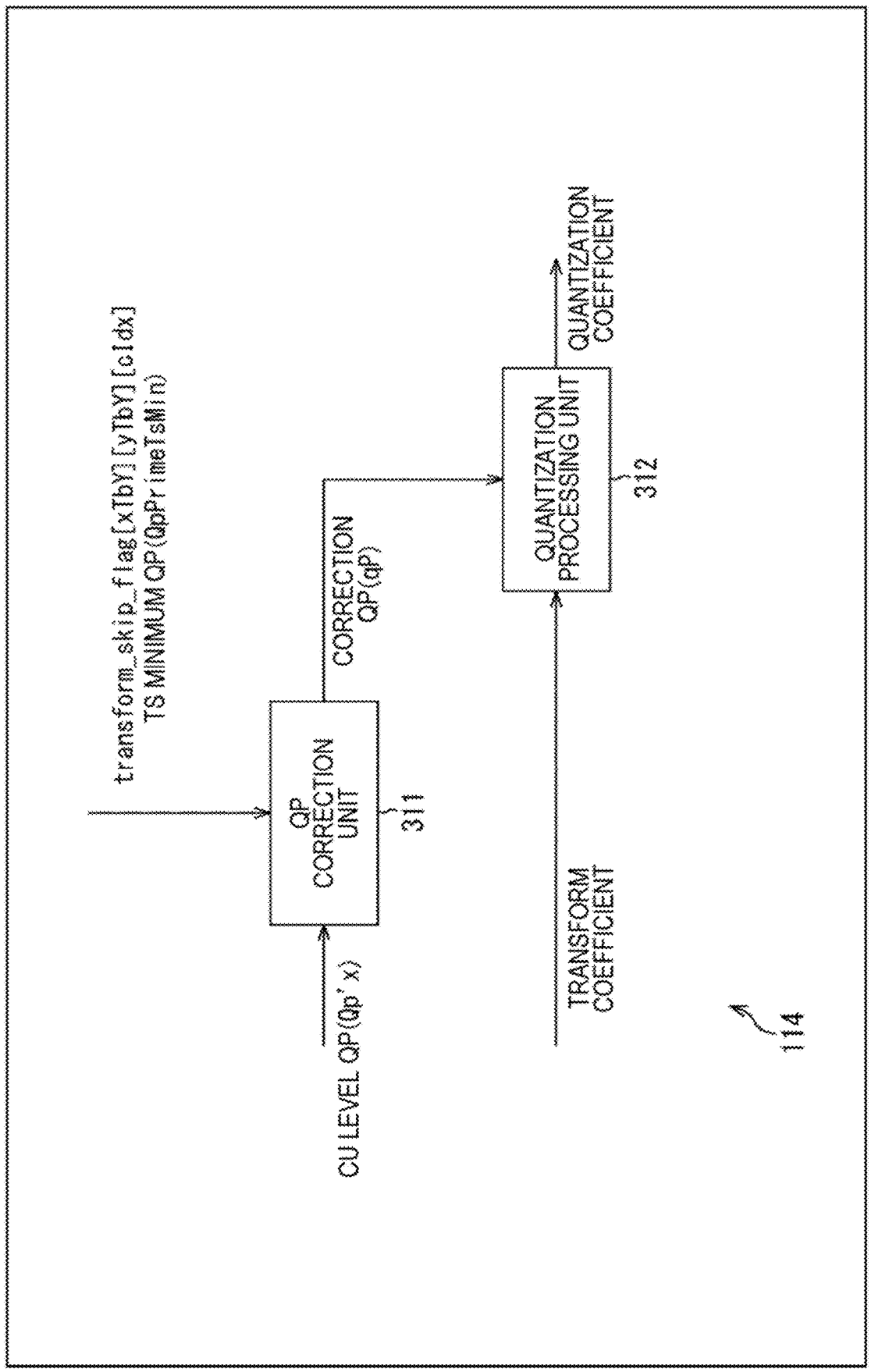
FIG. 21 is a block diagram illustrating a main configuration example of a quantization unit.

Also in this case, the image encoding device 100 is similar to the example of FIG. 2. FIG. 21 is a block diagram illustrating a main configuration example of the quantization unit 114 in this case. As illustrated in FIG. 21, the quantization unit 114 in this case includes a QP correction unit 311 and a quantization processing unit 312.

The QP correction unit 311 performs processing related to correction of the quantization parameter. For example, the QP correction unit 311 refers to the transform skip flag corresponding to the component identifier cIdx, a joint chrominance encoding mode information TuResMode, a QP(Op') at the CU-level corresponding to the component identifier cIdx, and the minimum QP(QpPrimeTsMin) of the transform skip to derive the quantization parameter Qp to be applied to the processing target transform block corresponding to the component identifier cIdx. Types of the quantization parameters include Qp'y, Qp'cb, Qp'cr, and Qp'cbcr. Furthermore, notification of the minimum quantization parameter QpPrimeTsMin for transform skip is provided by a parameter set.

Note that the joint chrominance encoding mode is a mode in which only one of the chrominance components (Cb, Cr) is transmitted, and the other is derived from the one and is not transmitted. For example, only the residual of Cr is encoded and transmitted, and the residual of Cb is derived from the residual of Cr and is not transmitted. The joint chrominance encoding mode information TuResMode is information related to such a joint chrominance encoding mode.

The QP correction unit 311 supplies a quantization parameter (corrected QP(qP)) after correction to the quantization processing unit 312.

The quantization processing unit 312 quantizes the coefficient data (transform coefficient) using the quantization parameter (correction QP(qP)) supplied from the QP correction unit 311 to generate a quantization coefficient. The quantization processing unit 312 supplies the generated quantization coefficient to the encoding unit 115 and the inverse quantization unit 117.

<Flow of Quantization Processing>

Figure 22:
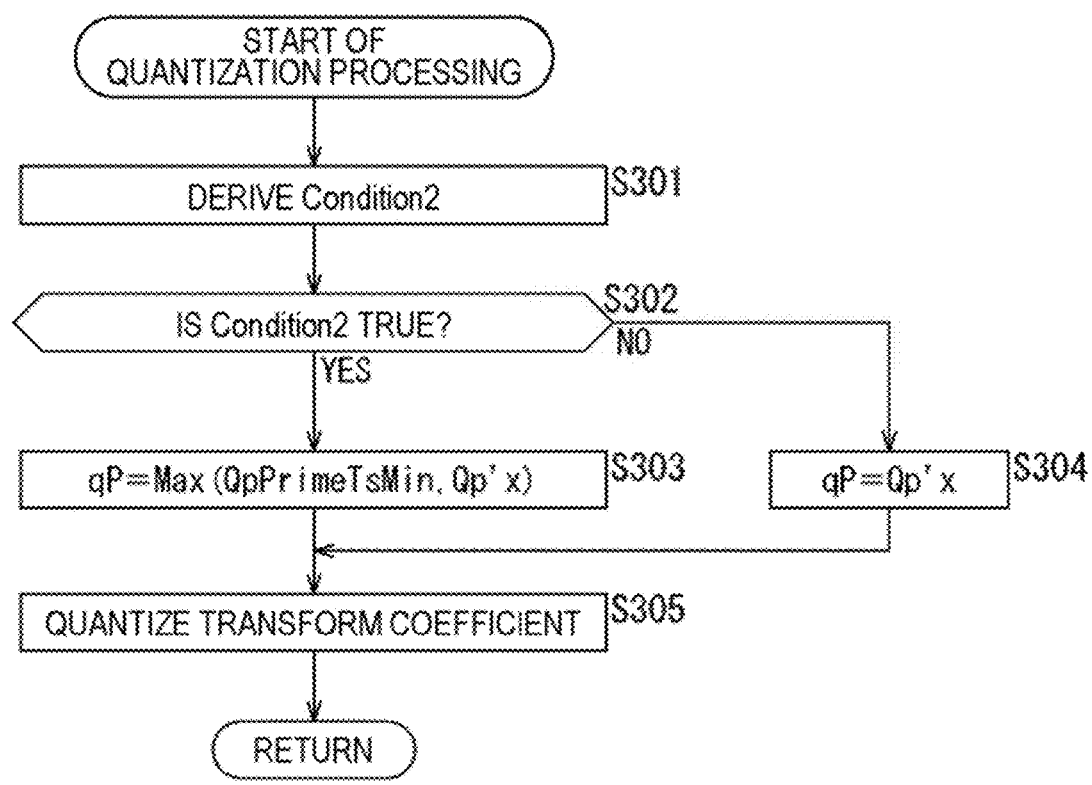
FIG. 22 is a flowchart illustrating an example of a flow of quantization processing.

An example of a flow of the quantization processing in this case executed in step S108 of FIG. 4 will be described with reference to a flowchart of FIG. 22. When the quantization processing is started, the QP correction unit 311 of the quantization unit 114 derives Condition2 by the following Expression (7) in step S301. That is, the QP correction unit 311 generates Condition2 using the transform skip flag (transform_skip_flag[cIdx]) corresponding to the component.

Condition2=(transform_skip_flag[cIdx]=="IS_SKIP")  (7)

Note that in a case where the identifier of the transform type of the primary transform is used, the transform type is derived as in the following (8).

Condition2(mts_idx[cIdx]="IS_SKIP")  (8)

In step S302, the QP correction unit 311 determines whether or not Condition2 is true. In a case where Condition2 is true, that is, in a case where the transform skip flag (transform_skip_flag[cIdx]) corresponding to the component is true (IS_SKIP), the processing proceeds to step S303.

In step S303, the QP correction unit 311 corrects the quantization parameter QP. In this case, for example, the QP correction unit 311 sets one having a larger value of the minimum quantization parameter (QpPrimeTsMin) for the transform skip and the quantization parameter QP'x at the CU level as the quantization parameter (correction QP(qP)) to be applied to the processing target transform block corresponding to the component identifier. When the processing of step S303 ends, the processing proceeds to step S305.

Furthermore, in a case where Condition2 is determined to be false, the processing proceeds to step S304. In this case, for example, the QP correction unit 311 sets the CU-level quantization parameter QP'x as the quantization parameter (correction QP(qP)) to be applied to the processing target transform block corresponding to the component identifier. When the processing of step S304 ends, the processing proceeds to step S305.

In step S305, the quantization processing unit 312 quantizes the transform coefficient by using the quantization parameter updated in step S303 or step S304. When the processing of step S305 ends, the quantization processing ends, and the processing returns to FIG. 4.

This makes it possible to suppress decrease in PSNR.

<4-2. Correction of Quantization Parameter in Inverse Quantization>

In the inverse quantization, similarly, the quantization parameter may be corrected in a case of the transform skip in each value of the component identifier. That is, in a case where the transform skip is applied, the quantization parameter may be corrected. Then, such control may be performed for each component.

<Inverse Quantization Unit>

Figure 23:
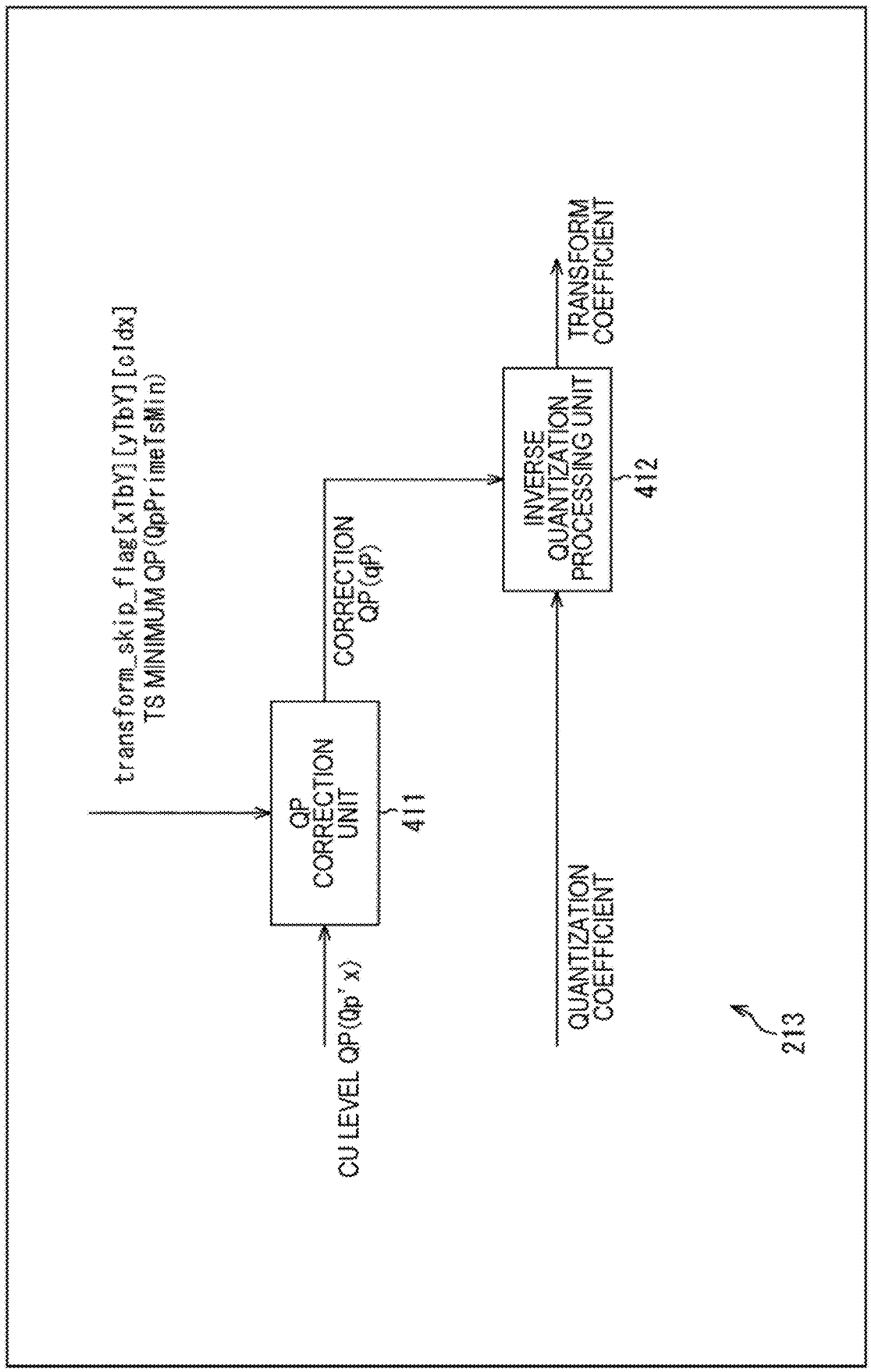
FIG. 23 is a block diagram illustrating a main configuration example of an inverse quantization unit.

Also in this case, the image decoding device 200 is similar to the example of FIG. 6. FIG. 23 is a block diagram illustrating a main configuration example of the inverse quantization unit 213 in this case. As illustrated in FIG. 23, the inverse quantization unit 213 in this case includes a QP correction unit 411 and an inverse quantization processing unit 412.

The QP correction unit 411 performs processing related to correction of the quantization parameter. For example, the QP correction unit 411 refers to the transform skip flag corresponding to the component identifier cIdx, the joint chrominance encoding mode information TuResMode, the QP(Qp') at the CU-level corresponding to the component identifier cIdx, and the minimum QP(QpPrimeTsMin) of the transform skip to derive the quantization parameter Qp to be applied to the processing target transform block corresponding to the component identifier cIdx. Types of the quantization parameters include Qp'y, Qp'cb, Qp'cr, and Qp'cbcr. Furthermore, notification of the minimum quantization parameter QpPrimeTsMin for transform skip is provided by a parameter set.

The QP correction unit 411 supplies the quantization parameter (corrected QP(qP)) after correction to the inverse quantization processing unit 412.

The inverse quantization processing unit 412 performs the inverse quantization of the quantization coefficient using the quantization parameter (correction QP(qP)) supplied from the QP correction unit 411 to generate coefficient data (transform coefficient). The inverse quantization processing unit 412 supplies the generated coefficient data to the inverse orthogonal transform unit 214.

<Flow of Inverse Quantization Processing>

Figure 24:
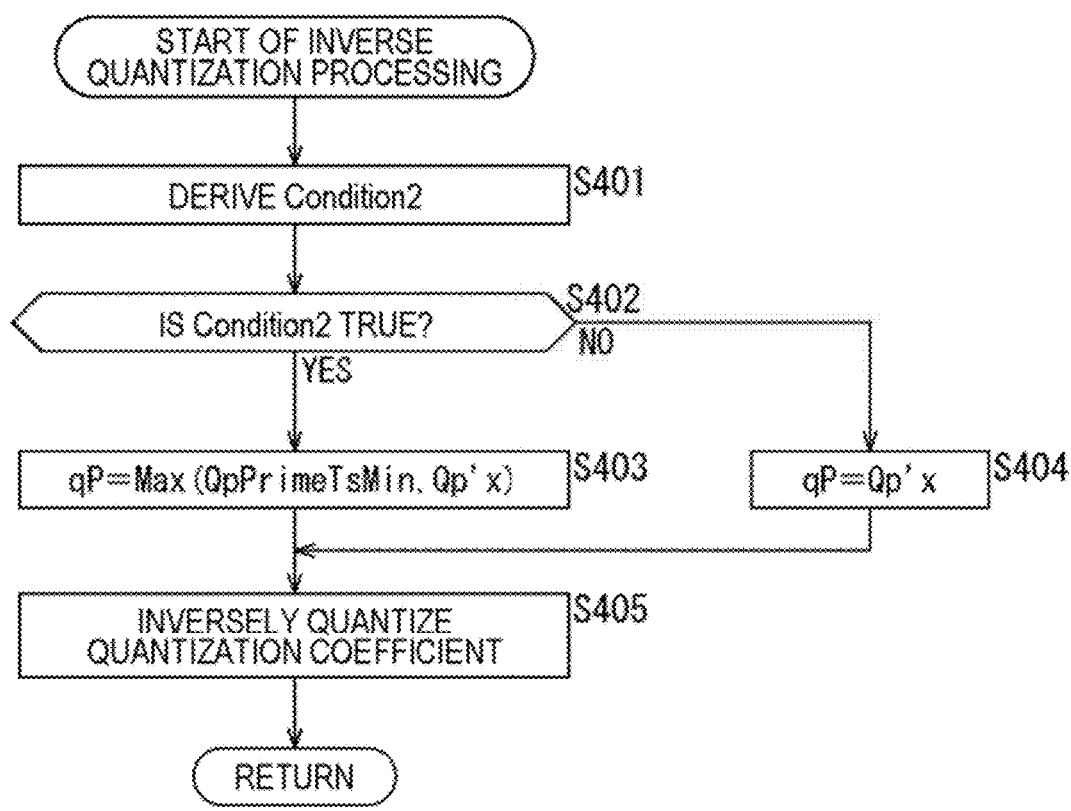
FIG. 24 is a flowchart illustrating an example of a flow of inverse quantization processing.

An example of a flow of the inverse quantization processing in this case executed in step S203 of FIG. 8 will be described with reference to a flowchart of FIG. 24. When the inverse quantization processing is started, the QP correction unit 411 of the inverse quantization unit 213 derives Condition2 by the above-described Expression (7) in step S401. That is, the QP correction unit 411 generates Condition2 using the transform skip flag (transform_skip_flag [cIdx]) corresponding to the component. As described in the first embodiment, the transform skip flag is obtained by being decoded by the transform mode information decoding unit 250.

In step S402, the QP correction unit 411 determines whether or not Condition2 is true. In a case where Condition2 is true, that is, in a case where the transform skip flag (transform_skip_flag[cIdx]) corresponding to the component is true (IS_SKIP), the processing proceeds to step S403.

In step S403, the QP correction unit 411 corrects the quantization parameter QP. In this case, for example, the QP correction unit 411 sets one having a larger value of the minimum quantization parameter (QpPrimeTsMin) for the transform skip and the quantization parameter QP'x at the CU level as the quantization parameter (correction QP(qP)) to be applied to the processing target transform block corresponding to the component identifier. When the processing of step S403 ends, the processing proceeds to step S405.

Furthermore, in a case where Condition2 is determined to be false, the processing proceeds to step S404. In this case, for example, the QP correction unit 411 sets the CU-level quantization parameter QP'x as the quantization parameter (correction QP(qP)) to be applied to the processing target transform block corresponding to the component identifier. When the processing of step S404 ends, the processing proceeds to step S405.

In step S405, the inverse quantization processing unit 412 inversely quantizes the quantization coefficient by using the quantization parameter updated in step S403 or step S404. When the processing of step S405 ends, the inverse quantization processing ends, and the processing returns to FIG. 8.

This makes it possible to suppress decrease in PSNR.

<4-3. Syntax>

FIG. 25 illustrates an example of the syntax of the quantization parameter in this case. As described above, the quantization parameter qP is corrected for each component by using the transform skip flag transform_skip_flag.

5. THIRD EMBODIMENT

<Sharing of Context Variable>

In a case where the transform skip is applied as described above, the context variable corresponding to each binIdx in the bin column of each syntax may be shared between the luminance components and the color components.

For example, in a case where the transform processing is skipped in encoding, the context variable may be shared between encoding of the luminance component of the coefficient data and encoding of the chrominance component.

Furthermore, for example, in a case where the inverse transform processing is skipped in decoding, the context variable may be shared between decoding of the coded data of the luminance component of the coefficient data and decoding of the coded data of the chrominance component.

An example of syntax regarding the context variable in this case is illustrated in FIG. 26. As in the example of FIG. 26, in a case where the transform skip is applied, the context variable may be derived by a common method for the luminance component and the color component.

Furthermore, another example of syntax regarding the context variable is illustrated in FIG. 27. As in the example of FIG. 27, in a case where the transform skip is applied, context variables may be derived by methods independent of each other for the luminance component and the color component.

As described above, by sharing the context variable corresponding to each binIdx in the bin row of each syntax between the luminance components and the color components, it is possible to suppress an increase in memory size for holding the context variable. Therefore, it is possible to suppress increase in hardware cost.

6. FOURTH EMBODIMENT

<Control of Encoding-Decoding Mode of Sign Code>

Furthermore, the encoding and decoding method of the sign code may be switched according to the transform skip flag corresponding to the component identifier. FIG. 28 illustrates an example of syntax in this case.

As in the column of binIdx=0 in the table illustrated in FIG. 28, for example, in a case where the transform skip is not performed, bypass encoding-decoding may be applied to encoding and decoding of the sign code. Furthermore, for example, in the case of transform skip, if the number of remaining context encoding bins is equal to or larger than a threshold, the context encoding and decoding may be applied to encoding and decoding of the sign code, and if not, bypass encoding-decoding may be applied to encoding and decoding of the sign code ((MaxCcbs>0)? (0 . . . 5): bypass).

In this manner, reduction in encoding efficiency can be suppressed.

7. APPENDIX

<Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

Figure 29:
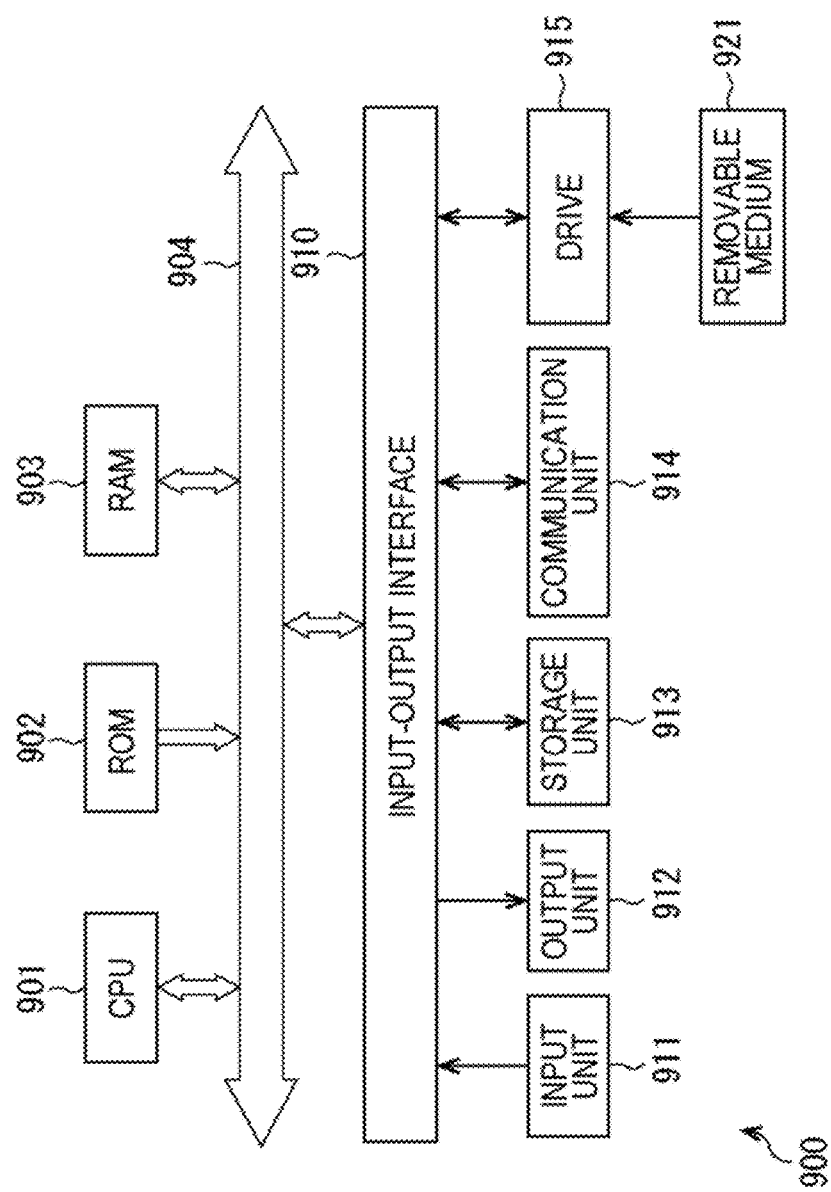
FIG. 29 is a block diagram illustrating a main configuration example of a computer.

FIG. 29 is a block diagram illustrating a configuration example of hardware of a computer that executes the above-described series of processes by a program.

In a computer 900 illustrated in FIG. 29, a central processing unit (CPU) 901, a read only memory (ROM) 902, and a random access memory (RAM) 903 are interconnected via a bus 904.

An input-output interface 910 is also connected to the bus 904. An input unit 911, an output unit 912, a storage unit 913, a communication unit 914, and a drive 915 are connected to the input-output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads, for example, a program stored in the storage unit 913 into the RAM 903 via the input-output interface 910 and the bus 904 and executes the program, so as to perform the above-described series of processing. The RAM 903 also appropriately stores data necessary for the CPU 901 to execute various processes, and the like.

The program executed by the computer can be applied by being recorded in the removable medium 921 as a package medium or the like, for example. In this case, the program can be installed in the storage unit 913 via the input-output interface 910 by attaching the removable medium 921 to the drive 915.

Furthermore, this program can be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

<Unit of Information and Processing>

The data units in which the various information described above is set and the data units targeted by the various processes are arbitrary and are not limited to the above-described examples. For example, these information and processes may be set in every transform unit (TU), transform block (TB), prediction unit (PU), prediction block (PB), coding unit (CU), largest coding unit (LCU), sub-block, block, tile, slice, picture, sequence, or component, or data in those data units may be targeted. Of course, this data unit can be set for every pieces of information or process, and it is not necessary that the data units of all the pieces of information or processes are unified. Note that the storage location of these information is arbitrary, and may be stored in a header, parameter set, or the like of the above-described data units. Furthermore, it may be stored in a plurality of places.

<Control Information>

The control information related to the present technology described in each of the above embodiments may be transmitted from the encoding side to the decoding side. For example, control information (for example, enabled_flag) that controls whether or not the application of the present technology described above is permitted (or prohibited) may be transmitted. Furthermore, for example, control information (for example, present_flag) indicating an object to which the above-described present technology is applied (or an object to which the present technology is not applied) may be transmitted. For example, the control information may be transmitted that specifies a block size (upper or lower limits, or both) by which the present technology is applied (or application thereof is allowed or prohibited), frame, component, layer, or the like.

<Applicable Target of the Present Technology>

The present technology can be applied to any image encoding and decoding method. That is, as long as it does not contradict the present technology described above, the specifications of various processes related to the image encoding and decoding, such as transform (inverse transform), quantization (inverse quantization), encoding (decoding), and prediction are arbitrary, and are not limited to the above-described examples. Furthermore, some of these processes may be omitted as long as they do not contradict the present technology described above.

Furthermore, the present technology can be applied to a multi-view image encoding-decoding system that encodes and decodes a multi-view image including images of a plurality of viewpoints (views). In this case, the present technology is only required to be applied to encoding and decoding of each viewpoint (view).

Furthermore, the present technology can be applied to a hierarchical image encoding (scalable encoding) and decoding system that encodes and decodes a hierarchical image layered (hierarchized) so as to have a scalability function for a predetermined parameter. In this case, the present technology is only required to be applied to encoding and decoding of each hierarchy (layer).

Furthermore, in the above description, the image encoding device 100 and the image decoding device 200 have been described as application examples of the present technology, but the present technology can be applied to any configuration.

For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or a device (for example, a hard disk recorder and a camera) that records an image on a medium such as an optical disk, a magnetic disk, and a flash memory, or reproduces an image from the storage medium.

Furthermore, for example, the present technology can also be implemented as a partial configuration of a device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to an arbitrary terminal such as a computer, an audio visual (AV) device, a portable information processing terminal, or an Internet of Things (IoT) device.

Note that in the present description, the system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are all systems.

<Field and Application to which Present Technology is Applicable>

Note that the system, device, processing unit, and the like to which the present technology is applied can be used in any fields, for example, traffic, medical care, crime prevention, agriculture, livestock industry, mining, beauty, factory, household appliance, weather, nature monitoring, and the like. Furthermore, its use is arbitrary.

For example, the present technology can be applied to systems and devices used for providing contents for appreciation and the like. Furthermore, for example, the present technology can also be applied to systems and devices used for traffic, such as traffic condition management and autonomous driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, a state of natural such as a volcano, a forest, and the ocean, wildlife, and the like. Moreover, for example, the present technology can also be applied to systems and devices used for sports.

<Others>

Note that in the present description, the "flag" is information for identifying a plurality of states, and includes not only information used for identifying two states of true (1) or false (0), but also information that can identify three or more states. Therefore, the value that this "flag" can take may be, for example, two values of 1 and 0, or 3 or more values. That is, the number of bits constituting this "flag" is arbitrary, and may be 1 bit or a plurality of bits. Furthermore, identification information (including the flag) is assumed to include not only identification information thereof in a bit stream but also difference information of the identification information with respect to a certain reference information in the bitstream, and thus, in the present description, the "flag" and "identification information" include not only the information thereof but also the difference information with respect to the reference information.

Furthermore, various types of information (metadata and the like) related to the coded data (bit stream) may be transmitted or recorded in any form as long as the information is associated with the coded data. Here, the term "associate" means, for example, that one data can be used (linked) when the other data is processed. That is, the data associated with each other may be collected as one data or may be individual data. For example, information associated with coded data (image) may be transmitted on a transmission path different from that of the coded data (image). Furthermore, for example, the information associated with the coded data (image) may be recorded in a recording medium (or another recording area of the same recording medium) different from the coded data (image). Note that this "association" may be a part of data instead of the entire data. For example, an image and information corresponding to the image may be associated with each other in an arbitrary unit such as a plurality of frames, one frame, or a part of the frame.

Note that, in the present description, terms such as "combine", "multiplex", "add", "integrate", "include", "store", "insert", and "insert" mean to combine a plurality of items into one, for example, to combine coded data and metadata into one data, and mean one method of the above-described "associate".

Furthermore, the embodiments of the present technology are not limited to the above-described embodiments, and various modifications are possible without departing from the scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than those described above may of course be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the above-described program may be executed in an arbitrary device. In this case, it is sufficient if the device has necessary functions (functional blocks and the like) and can acquire necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can be executed as processes of a plurality of steps. Conversely, a process described as a plurality of steps can be collectively executed as one step.

Furthermore, for example, in the program executed by the computer, processing of steps describing the program may be executed in time series in the order described in the present description, or may be executed in parallel or individually at necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Furthermore, for example, a plurality of techniques related to the present technology can be implemented independently as a single body as long as there is no contradiction. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

Note that the present technology can have configurations as follows.

(1) An image processing device including:
  a flag generation unit that generates a transform skip flag that is flag information indicating, for each component, whether or not to skip transform processing of transforming a residual between an image and a predicted image of the image into coefficient data in encoding of the image;
  a flag encoding unit that encodes the transform skip flag generated by the flag generation unit and generates coded data of the transform skip flag; and
  a bit stream generation unit that generates a bit stream including the coded data of the transform skip flag generated by the flag encoding unit.

(2) The image processing device according to (1), further including:
  a mode control unit that controls, on the basis of the transform skip flag corresponding to a component identifier generated by the flag generation unit, whether an encoding mode of coefficient data corresponding to the component identifier is set to a TS residual encoding mode that is a mode for a case of skipping the transform processing or a non-TS residual encoding mode that is a mode for a case of not skipping the transform processing; and
  a coefficient data encoding unit that encodes coefficient data corresponding to the component identifier by the encoding mode set by the mode control unit and generates coded data of the coefficient data,
  in which the bit stream generation unit generates a bit stream including coded data of the transform skip flag generated by the flag encoding unit and the coded data of the coefficient data generated by the coefficient data encoding unit.

(3) The image processing device according to (2), in which
  in a case where the transform processing is skipped, the coefficient data encoding unit shares a context variable between encoding of a luminance component of the coefficient data and encoding of a chrominance component.

(4) The image processing device according to (2) or (3), in which
the coefficient data encoding unit applies an encoding method of a sign code according to the transform skip flag generated by the flag generation unit.
(5) The image processing device according to any one of (1) to (4), in which
the flag generation unit further generates a transform skip residual encoding use flag that is flag information indicating whether to apply a TS residual encoding mode that is a mode for a case of skipping the transform processing or to apply a non-TS residual encoding mode that is a mode for a case of not skipping the transform processing,
the flag encoding unit further encodes the transform skip residual encoding use flag generated by the flag generation unit, and generates coded data of the transform skip residual encoding use flag, and
the bit stream generation unit generates the bit stream further including the coded data of the transform skip residual encoding use flag generated by the flag encoding unit.
(6) The image processing device according to any one of (1) to (5), in which
the flag generation unit further generates a transform skip residual encoding use specifying mode flag that is flag information indicating whether to apply a TS residual encoding mode that is a mode for a case of skipping the transform processing or to apply a non-TS residual encoding mode that is a mode for a case of not skipping the transform processing in a specific mode,
the flag encoding unit further encodes the transform skip residual encoding use specifying mode flag generated by the flag generation unit, and generates coded data of the transform skip residual encoding use specifying mode flag, and
the bit stream generation unit generates the bit stream further including coded data of the transform skip residual encoding use specifying mode flag generated by the flag encoding unit.
(7) A bit stream generation method including:
generating a transform skip flag that is flag information indicating, for each component, whether or not to skip transform processing of transforming a residual between an image and a predicted image of the image into coefficient data in encoding of the image;
encoding the transform skip flag generated and generating coded data of the transform skip flag; and
generating a bit stream including the coded data of the transform skip flag generated.
(8) An image processing device including:
a quantization parameter correction unit that, in a case where a transform skip flag corresponding to a component identifier indicates a transform skip for skipping transform processing for transforming a residual between an image and a predicted image of the image into a transform coefficient in encoding the image, corrects a quantization parameter to be applied to a processing target transform block corresponding to the component identifier; and
a quantization unit that performs quantization of the processing target transform block corresponding to the component identifier by using the quantization parameter corrected by the quantization parameter correction unit.

(9) The image processing device according to (8), in which
the quantization parameter correction unit
sets, in a case where the transform skip flag corresponding to the component identifier indicates the transform skip, one having a larger value of a minimum quantization parameter for the transform skip and a quantization parameter corresponding to the component identifiers as the quantization parameter to be applied to the processing target transform block corresponding to the component identifier, and
sets, in a case where the transform skip flag corresponding to the component identifier indicates non-transform skip in which the transform skip is not performed, the quantization parameter corresponding to the component identifier as the quantization parameter to be applied to the processing target transform block corresponding to the component identifier.
(10) A quantization coefficient generation method including:
correcting, in a case where a transform skip flag corresponding to a component identifier indicates a transform skip for skipping transform processing for transforming a residual between an image and a predicted image of the image into a transform coefficient in encoding the image, a quantization parameter to be applied to a processing target transform block corresponding to the component identifier; and
performing quantization of the processing target transform block corresponding to the component identifier by using the quantization parameter corrected, and generating a quantization coefficient corresponding to the component identifier.
(11) An image processing device including:
a flag decoding unit that decodes coded data of a transform skip flag corresponding to a component identifier and obtains the transform skip flag corresponding to the component identifier;
a mode control unit that controls, on the basis of the transform skip flag corresponding to the component identifier obtained by the flag decoding unit, whether a decoding mode of coded data of coefficient data corresponding to the component identifier is set to a TS residual decoding mode that is a mode for a case of skipping inverse transform processing of transforming coefficient data into a residual between an image and a predicted image, or set to a non-TS residual decoding mode that is a mode for a case of not skipping the inverse transform processing; and
a coefficient data decoding unit that decodes the coded data of the coefficient data corresponding to the component identifier according to the decoding mode set by the mode control unit, and generates the coefficient data corresponding to the component identifier.
(12) The image processing device according to (11), in which
in a case where the inverse transform processing is skipped, the coefficient data decoding unit shares a context variable between decoding of coded data of a luminance component of the coefficient data and decoding of coded data of a chrominance component.
(13) The image processing device according to (11) or (12), in which
the coefficient data decoding unit applies a sign code decoding method according to the transform skip flag corresponding to the component identifier obtained by the flag decoding unit.

(14) The image processing device according to any one of (11) to (13), in which
the flag decoding unit further decodes coded data of a transform skip residual encoding use flag that is flag information indicating whether to apply the TS residual decoding mode or the non-TS residual decoding mode, and obtains the transform skip residual encoding use flag corresponding to the component identifier in a case where the inverse transform processing is skipped, and
the mode control unit further controls whether a decoding mode of the coded data of the coefficient data corresponding to the component identifier is set to the TS residual decoding mode or the non-TS residual decoding mode on the basis of the transform skip residual encoding use flag corresponding to the component identifier generated by the flag decoding unit.

(15) The image processing device according to any one of (11) to (14), in which
the flag decoding unit further decodes coded data of a transform skip residual encoding use specifying mode flag that is flag information indicating whether to apply the TS residual decoding mode or the non-TS residual decoding mode in a specific mode, and obtains the transform skip residual encoding use specifying mode flag corresponding to the component identifier, and
the mode control unit further controls whether a decoding mode of the coded data of the coefficient data corresponding to the component identifier is set to the TS residual decoding mode or the non-TS residual decoding mode on the basis of the transform skip residual encoding use specifying mode flag corresponding to the component identifier generated by the flag decoding unit.

(16) A coefficient data generation method including:
decoding coded data of a transform skip flag corresponding to a component identifier and obtaining the transform skip flag corresponding to the component identifier;
controlling, on the basis of the transform skip flag corresponding to the component identifier obtained, whether a decoding mode of coded data of coefficient data corresponding to the component identifier is set to a TS residual decoding mode that is a mode for a case of skipping inverse transform processing of transforming coefficient data into a residual between an image and a predicted image, or set to a non-TS residual decoding mode that is a mode for a case of not skipping the inverse transform processing; and
decoding the coded data of the coefficient data corresponding to the component identifier according to the decoding mode set, and generating the coefficient data corresponding to the component identifier.

(17) An image processing device including:
a quantization parameter correction unit that, in a case where a transform skip flag corresponding to a component identifier indicates a transform skip for skipping inverse transform processing of transforming coefficient data into a residual between an image and a predicted image, corrects a quantization parameter to be applied to a processing target transform block corresponding to the component identifier; and
an inverse quantization unit that performs inverse quantization of a processing target transform block corresponding to the component identifier by using the quantization parameter corrected by the quantization parameter correction unit.

(18) An image processing device according to (17), in which
the quantization parameter correction unit
sets, in a case where the transform skip flag corresponding to the component identifier indicates the transform skip, one having a larger value of a minimum quantization parameter for the transform skip and a quantization parameter corresponding to the component identifier as the quantization parameter to be applied to the processing target transform block corresponding to the component identifier, and
sets, in a case where the transform skip flag corresponding to the component identifier indicates non-transform skip in which the transform skip is not performed, the quantization parameter corresponding to the component identifier as the quantization parameter to be applied to the processing target transform block corresponding to the component identifier.

(19) The image processing device according to (17) or (18), further including:
a flag decoding unit that decodes coded data of the transform skip flag corresponding to the component identifier and obtains the transform skip flag corresponding to the component identifier,
in which in a case where the transform skip flag corresponding to the component identifier obtained by the flag decoding unit indicates the transform skip, the quantization parameter correction unit corrects the quantization parameter to be applied to the processing target transform block corresponding to the component identifier.

(20) A coefficient data generation method including:
correcting, in a case where a transform skip flag corresponding to a component identifier indicates a transform skip for skipping inverse transform processing of transforming coefficient data into a residual between an image and a predicted image, a quantization parameter to be applied to a processing target transform block corresponding to the component identifier; and
performing inverse quantization of a processing target transform block corresponding to the component identifier by using the quantization parameter corrected, and generates the coefficient data corresponding to the component identifier.

REFERENCE SIGNS LIST

100 Image encoding device
101 Control unit
114 Quantization unit
115 Encoding unit
150 Transform mode information encoding unit
151 Control unit
152 Selection unit
153 TS residual encoding unit
154 Non-TS residual encoding unit
155 Selection unit
200 Image decoding device
212 Decoding unit
213 Inverse quantization unit
250 Transform mode information decoding unit
251 Control unit
252 Selection unit
253 TS residual decoding unit
254 Non-TS residual decoding unit
255 Selection unit
311 QP correction unit 312 Quantization processing unit
411 QP correction unit
412 Inverse quantization processing unit

The invention claimed is:

1. An image processing device comprising:
a flag decoder that decodes coded data of a transform skip flag corresponding to a component identifier and obtains the transform skip flag corresponding to the component identifier, wherein the component identifier identifies luminance and chrominance;
a mode controller that controls, on a basis of the transform skip flag corresponding to the component identifier obtained by the flag decoder, whether a decoding mode of coded data of coefficient data corresponding to the component identifier is set to a transform skip (TS) residual decoding mode that is a mode for a case of skipping inverse transform processing of transforming coefficient data into a residual between an image and a predicted image, or set to a non-TS residual decoding mode that is a mode for a case of not skipping the inverse transform processing, wherein based on the transform skip flag, data of the residual is decoded according to a syntax structure corresponding to each decoding mode set by the mode controller; and
a coefficient data decoder that decodes the coded data of the coefficient data corresponding to the component identifier according to the decoding mode set by the mode controller, and generates the coefficient data corresponding to the component identifier,
wherein in a case that the TS residual decoding mode is set, when a number of residual context coding bins is determined to be equal to or greater than a threshold, context decoding is applied to decoding of a sign code, and when the number of residual context coding bins is determined to be not equal to or greater than the threshold, bypass decoding is applied to the decoding of the sign code, and
wherein in a case where the inverse transform processing is skipped, the coefficient data decoder shares a context variable between decoding of coded data of a luminance component of the coefficient data and decoding of coded data of a chrominance component.

2. The image processing device according to claim 1, wherein
the coefficient data decoder applies a sign code decoding method according to the transform skip flag corresponding to the component identifier obtained by the flag decoder.

3. The image processing device according to claim 1, wherein
the flag decoder further decodes coded data of a transform skip residual encoding use flag that is flag information indicating whether to apply the TS residual decoding mode or the non-TS residual decoding mode, and obtains the transform skip residual encoding use flag corresponding to the component identifier in the case where the inverse transform processing is skipped, and
the mode controller further controls whether a decoding mode of the coded data of the coefficient data corresponding to the component identifier is set to the TS residual decoding mode or the non-TS residual decoding mode on a basis of the transform skip residual encoding use flag corresponding to the component identifier generated by the flag decoder.

4. The image processing device according to claim 1, wherein
the flag decoder further decodes coded data of a transform skip residual encoding use specifying mode flag that is flag information indicating whether to apply the TS residual decoding mode or the non-TS residual decoding mode in a specific mode, and obtains the transform skip residual encoding use specifying mode flag corresponding to the component identifier, and
the mode controller further controls whether a decoding mode of the coded data of the coefficient data corresponding to the component identifier is set to the TS residual decoding mode or the non-TS residual decoding mode on a basis of the transform skip residual encoding use specifying mode flag corresponding to the component identifier generated by the flag decoder.

5. A coefficient data generation method comprising:
decoding coded data of a transform skip flag corresponding to a component identifier and obtaining the transform skip flag corresponding to the component identifier, wherein the component identifier identifies luminance and chrominance;
controlling, on a basis of the transform skip flag corresponding to the component identifier obtained, whether a decoding mode of coded data of coefficient data corresponding to the component identifier is set to a TS residual decoding mode that is a mode for a case of skipping inverse transform processing of transforming coefficient data into a residual between an image and a predicted image, or set to a non-TS residual decoding mode that is a mode for a case of not skipping the inverse transform processing, wherein based on the transform skip flag, data of the residual is decoded according to a syntax structure corresponding to each decoding mode set by the mode controller; and
decoding the coded data of the coefficient data corresponding to the component identifier according to the decoding mode set, and generating the coefficient data corresponding to the component identifier,
in a case that the TS residual decoding mode is set, when a number of residual context coding bins is determined to be equal to or greater than a threshold, applying context decoding to decoding of a sign code, and when the number of residual context coding bins is determined to be not equal to or greater than the threshold, applying bypass decoding to the decoding of the sign code, and
wherein in a case where the inverse transform processing is skipped, sharing a context variable between decoding of coded data of a luminance component of the coefficient data and decoding of coded data of a chrominance component.

6. An image processing device comprising:
a quantization parameter corrector that, in a case where a transform skip flag corresponding to a component identifier indicates a transform skip for skipping inverse transform processing of transforming coefficient data into a residual between an image and a predicted image, corrects a quantization parameter to be applied to a processing target transform block corresponding to the component identifier, wherein the component identifier identifies luminance and chrominance; and
inverse quantization circuitry that performs inverse quantization of a processing target transform block corresponding to the component identifier by using the quantization parameter corrected by the quantization parameter corrector, wherein in a case that a transform skip (TS) residual decoding mode that is a mode for a case of the skipping of the inverse transform processing of the transforming coefficient data into the residual between the image and the predicated image is set, when a number of residual context coding bins is determined to be equal to or greater than a threshold, context decoding is applied to decoding of a sign code, and when the number of residual context coding bins is determined to be not equal to or greater than the threshold, bypass decoding is applied to the decoding of the sign code, and wherein in a case where the inverse transform processing is skipped, a coefficient data decoder shares a context variable between decoding of coded data of a luminance component of the coefficient data and decoding of coded data of a chrominance component.

7. The image processing device according to claim 6, wherein the quantization parameter corrector sets, in a case where the transform skip flag corresponding to the component identifier indicates the transform skip, one having a larger value of a minimum quantization parameter for the transform skip and a quantization parameter corresponding to the component identifier as the quantization parameter to be applied to the processing target transform block corresponding to the component identifier, and sets, in a case where the transform skip flag corresponding to the component identifier indicates non-transform skip in which the transform skip is not performed, the quantization parameter corresponding to the component identifier as the quantization parameter to be applied to the processing target transform block corresponding to the component identifier.

8. The image processing device according to claim 6, further comprising a flag decoder that decodes coded data of the transform skip flag corresponding to the component identifier and obtains the transform skip flag corresponding to the component identifier, wherein in a case where the transform skip flag corresponding to the component identifier obtained by the flag decoder indicates the transform skip, the quantization parameter corrector corrects the quantization parameter to be applied to the processing target transform block corresponding to the component identifier.

9. A coefficient data generation method comprising:

correcting, in a case where a transform skip flag corresponding to a component identifier indicates a transform skip for skipping inverse transform processing of transforming coefficient data into a residual between an image and a predicted image, a quantization parameter to be applied to a processing target transform block corresponding to the component identifier, wherein the component identifier identifies luminance and chrominance; and performing inverse quantization of a processing target transform block corresponding to the component identifier by using the quantization parameter corrected, and generates the coefficient data corresponding to the component identifier, wherein in a case that a transform skip (TS) residual decoding mode that is a mode for a case of the skipping of the inverse transform processing of the transforming coefficient data into the residual between the image and the predicated image is set, when a number of residual context coding bins is determined to be equal to or greater than a threshold, context decoding is applied to decoding of a sign code, and when the number of residual context coding bins is determined to be not equal to or greater than the threshold, bypass decoding is applied to the decoding of the sign code, and wherein in a case where the inverse transform processing is skipped, sharing a context variable between decoding of coded data of a luminance component of the coefficient data and decoding of coded data of a chrominance component.

10. The image processing device according to claim 1, wherein the flag decoder further decodes coded data of a transform skip residual encoding use flag that is flag information indicating whether to apply the TS residual decoding mode or the non-TS residual decoding mode, and obtains the transform skip residual encoding use flag corresponding to the component identifier in the case where the inverse transform processing is skipped.

11. The image processing device according to claim 1, wherein the flag decoder further decodes coded data of a transform skip residual encoding use specifying mode flag that is flag information indicating whether to apply the TS residual decoding mode or the non-TS residual decoding mode in a specific mode, and obtains the transform skip residual encoding use specifying mode flag corresponding to the component identifier.

* * * * *